United States Patent
Yasuzaki

(10) Patent No.: US 9,794,424 B2
(45) Date of Patent: Oct. 17, 2017

(54) APPARATUS WHICH CAUSES A DEVICE TO PRINT AN IMAGE AFTER COMMUNICATION WITH THE DEVICE VIA A SHORT DISTANCE WIRELESS COMMUNICATION

(71) Applicant: CANON KABUSHIKI KAISHA, Tokyo (JP)

(72) Inventor: Koji Yasuzaki, Tokorozawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/557,377

(22) Filed: Dec. 1, 2014

(65) Prior Publication Data
US 2015/0085310 A1 Mar. 26, 2015

Related U.S. Application Data

(63) Continuation of application No. 13/770,872, filed on Feb. 19, 2013, now abandoned.

(30) Foreign Application Priority Data

Mar. 5, 2012 (JP) .................................. 2012-048622

(51) Int. Cl.
H04N 1/00 (2006.01)
G06F 3/12 (2006.01)

(52) U.S. Cl.
CPC ........... H04N 1/001 (2013.01); G06F 3/1292 (2013.01); H04N 1/00127 (2013.01);
(Continued)

(58) Field of Classification Search
CPC ............... H04N 1/001; H04N 1/00973; H04N 1/00307; H04N 1/00127; H04N 1/00896;
(Continued)

(56) References Cited

U.S. PATENT DOCUMENTS 8,189,225 B1* 5/2012 Lo ........................... G06F 3/122
358/1.15
8,285,210 B2 10/2012 Oshima et al.
(Continued)

FOREIGN PATENT DOCUMENTS

JP 2001-334709 A 12/2001
JP 2002-041401 A 2/2002
(Continued)

OTHER PUBLICATIONS

Japanese Office Action dated Jul. 15, 2016 in Japanese Application No. 2016-020223.
(Continued)

*Primary Examiner* — Tammy Paige Goddard
*Assistant Examiner* — Edwin S Leland, III
(74) *Attorney, Agent, or Firm* — Fitzpatrick, Cella, Harper & Scinto

(57) ABSTRACT

An apparatus includes a communication unit which communicates with a communication device, and can write data received from the communication device in a memory. The apparatus receives an operation request to the apparatus from the communication device, and stores the received operation request in the memory. The apparatus has a function of specifying a function corresponding to the operation request of a plurality of functions included in the apparatus in a state in which the operation request is stored in the memory. When the function is specified, and is not activated, the apparatus activates the function, and controls the activated function.

29 Claims, 31 Drawing Sheets

PRINT INSTRUCTION SCREEN

(52) U.S. Cl.
CPC ..... *H04N 1/00307* (2013.01); *H04N 1/00896* (2013.01); *H04N 1/00973* (2013.01); *H04N 1/00204* (2013.01); *H04N 2201/006* (2013.01); *H04N 2201/0074* (2013.01); *H04N 2201/0084* (2013.01); *H04N 2201/0094* (2013.01); *H04N 2201/0096* (2013.01)

(58) Field of Classification Search
CPC ... H04N 2201/0096; H04N 2201/0084; H04N 2201/0074; H04N 2201/006; H04N 1/00204; H04N 2201/0094; G06F 3/1292
USPC .................................................. 358/1.13, 1.15
See application file for complete search history.

(56) References Cited

U.S. PATENT DOCUMENTS

| | | | | |
|---|---|---|---|---|
| 8,359,640 | B2* | 1/2013 | Hashimoto | G06F 21/35 358/1.15 |
| 8,630,020 | B2 | 1/2014 | Yoshida et al. | |
| 9,069,510 | B2* | 6/2015 | Chang | G06F 3/1245 |
| 2001/0034774 | A1* | 10/2001 | Watanabe | H04M 3/5322 709/217 |
| 2006/0221367 | A1* | 10/2006 | Shiokawa | H04N 1/00222 358/1.13 |
| 2007/0296981 | A1* | 12/2007 | Lee | G06F 3/1207 358/1.1 |
| 2008/0002219 | A1* | 1/2008 | Ha | H04N 1/00307 358/1.15 |
| 2008/0106604 | A1* | 5/2008 | Kojima | H04N 1/00278 348/207.2 |
| 2009/0033972 | A1* | 2/2009 | Kato | H04N 1/00347 358/1.13 |
| 2009/0052348 | A1* | 2/2009 | Kato | H04L 63/0492 370/254 |
| 2009/0103124 | A1* | 4/2009 | Kimura | G06F 3/1204 358/1.15 |
| 2010/0069008 | A1* | 3/2010 | Oshima | H04W 4/02 455/41.3 |
| 2010/0165397 | A1* | 7/2010 | Yamada | G06F 3/12 358/1.15 |
| 2010/0253963 | A1* | 10/2010 | Amano | G06F 3/1208 358/1.14 |
| 2010/0290074 | A1* | 11/2010 | Kuroishi | G03G 15/5004 358/1.14 |
| 2011/0016164 | A1* | 1/2011 | Maeshima | G06F 17/3028 707/813 |
| 2011/0134466 | A1* | 6/2011 | Nakagawa | G06F 3/1205 358/1.15 |
| 2011/0254687 | A1* | 10/2011 | Arponen | H04M 1/72525 340/540 |
| 2011/0292445 | A1* | 12/2011 | Kato | G06F 3/1222 358/1.15 |
| 2011/0321118 | A1* | 12/2011 | Boldyrev | G06F 21/35 726/1 |
| 2012/0019867 | A1* | 1/2012 | Prati | G06F 3/1204 358/1.15 |
| 2012/0021703 | A1* | 1/2012 | Yamazaki | H04W 48/20 455/90.2 |
| 2012/0026524 | A1* | 2/2012 | Sekido | G03G 15/80 358/1.13 |
| 2012/0069371 | A1* | 3/2012 | Fujii | G06F 3/1208 358/1.13 |
| 2012/0075485 | A1* | 3/2012 | Mizutani | H04M 1/7253 348/207.1 |
| 2012/0075651 | A1* | 3/2012 | Sasase | G06F 1/3209 358/1.13 |
| 2013/0201515 | A1* | 8/2013 | Daos | H04N 1/00095 358/1.14 |
| 2013/0229672 | A1* | 9/2013 | Naruse | H04N 1/00127 358/1.13 |
| 2013/0229683 | A1* | 9/2013 | Nakayama | G06K 15/402 358/1.15 |
| 2013/0229684 | A1* | 9/2013 | Yasuzaki | H04N 1/00127 358/1.15 |
| 2013/0229685 | A1* | 9/2013 | Naruse | G06F 3/1207 358/1.15 |
| 2013/0229687 | A1* | 9/2013 | Yamauchi | G06F 3/1204 358/1.15 |
| 2013/0229690 | A1* | 9/2013 | Sumita | H04N 1/00127 358/1.15 |
| 2014/0104639 | A1 | 4/2014 | Yoshida et al. | |
| 2014/0162598 | A1* | 6/2014 | Villa-Real | H04M 1/66 455/411 |

FOREIGN PATENT DOCUMENTS

| | | | |
|---|---|---|---|
| JP | 2002-142038 A | | 5/2002 |
| JP | 2002142038 A | * | 5/2002 |
| JP | 2004-153742 A | | 5/2004 |
| JP | 2004153742 A | * | 5/2004 |
| JP | 2007-159057 A | | 6/2007 |
| JP | 2007-166457 A | | 6/2007 |
| JP | 2007166457 A | * | 6/2007 |
| JP | 2009-75632 A | | 4/2009 |
| JP | 2009-086976 A | | 4/2009 |
| JP | 2009075632 A | * | 4/2009 |
| JP | 2009-260889 A | | 11/2009 |
| JP | 2010-033211 A | | 2/2010 |
| JP | 2010-041665 A | | 2/2010 |
| JP | 2010-98717 A | | 4/2010 |
| JP | 2010-131947 A | | 6/2010 |
| JP | 2011-18983 A | | 1/2011 |
| JP | 2011-044092 A | | 3/2011 |
| JP | 2011-60046 A | | 3/2011 |
| JP | 2011044092 A | * | 3/2011 |

OTHER PUBLICATIONS

Office Action dated Sep. 4, 2017, in Japanese Patent Application No. 2016-203028.

* cited by examiner

MFP OUTER APPEARANCE VIEW

MFP TOP VIEW

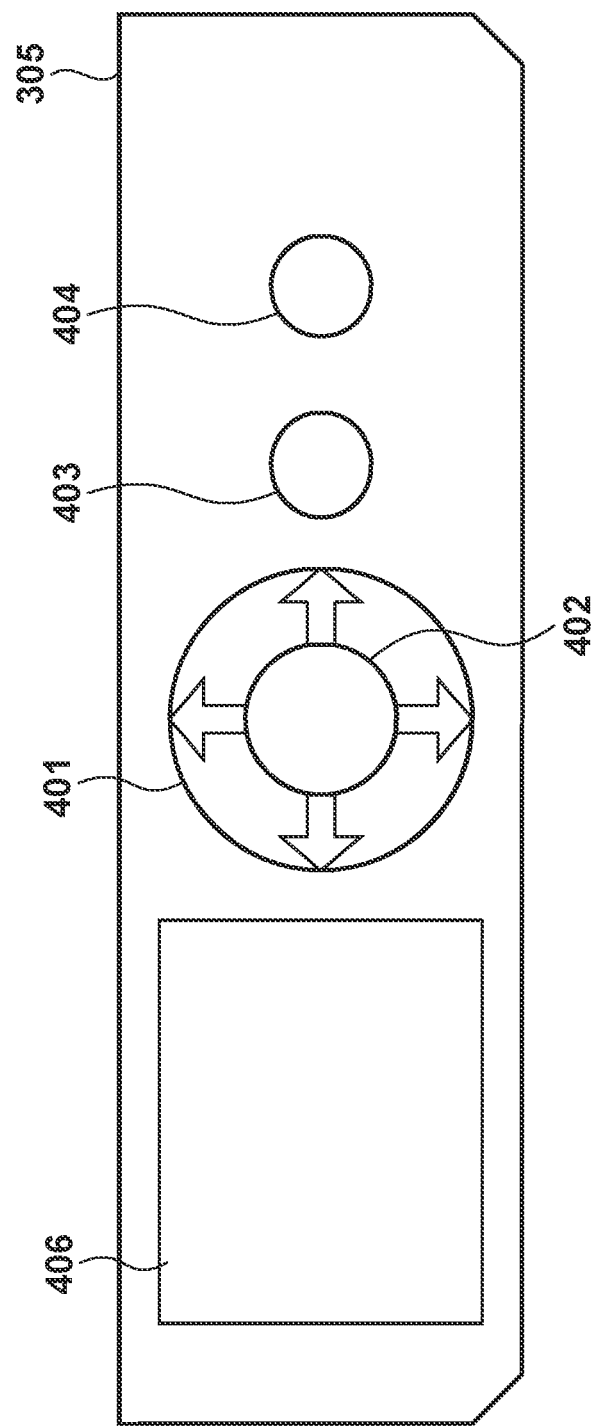

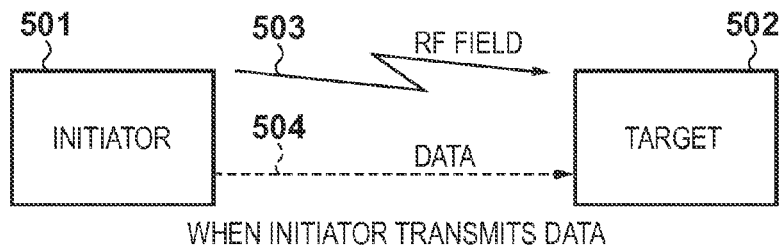
FIG. 5A — WHEN INITIATOR TRANSMITS DATA
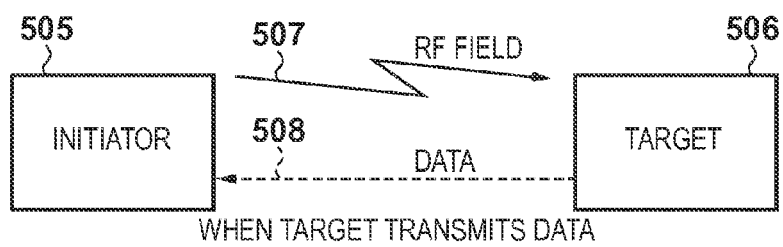
FIG. 5B — WHEN TARGET TRANSMITS DATA
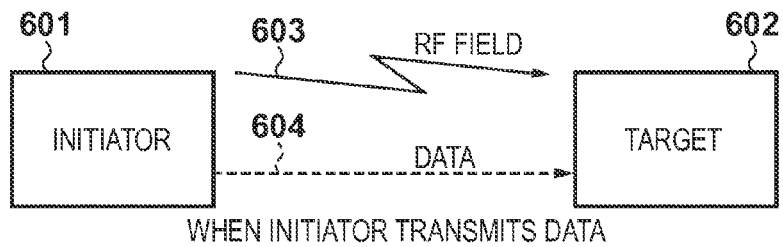
FIG. 6A — WHEN INITIATOR TRANSMITS DATA
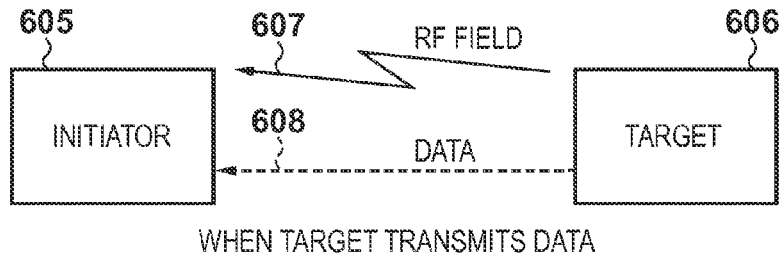
FIG. 6B — WHEN TARGET TRANSMITS DATA

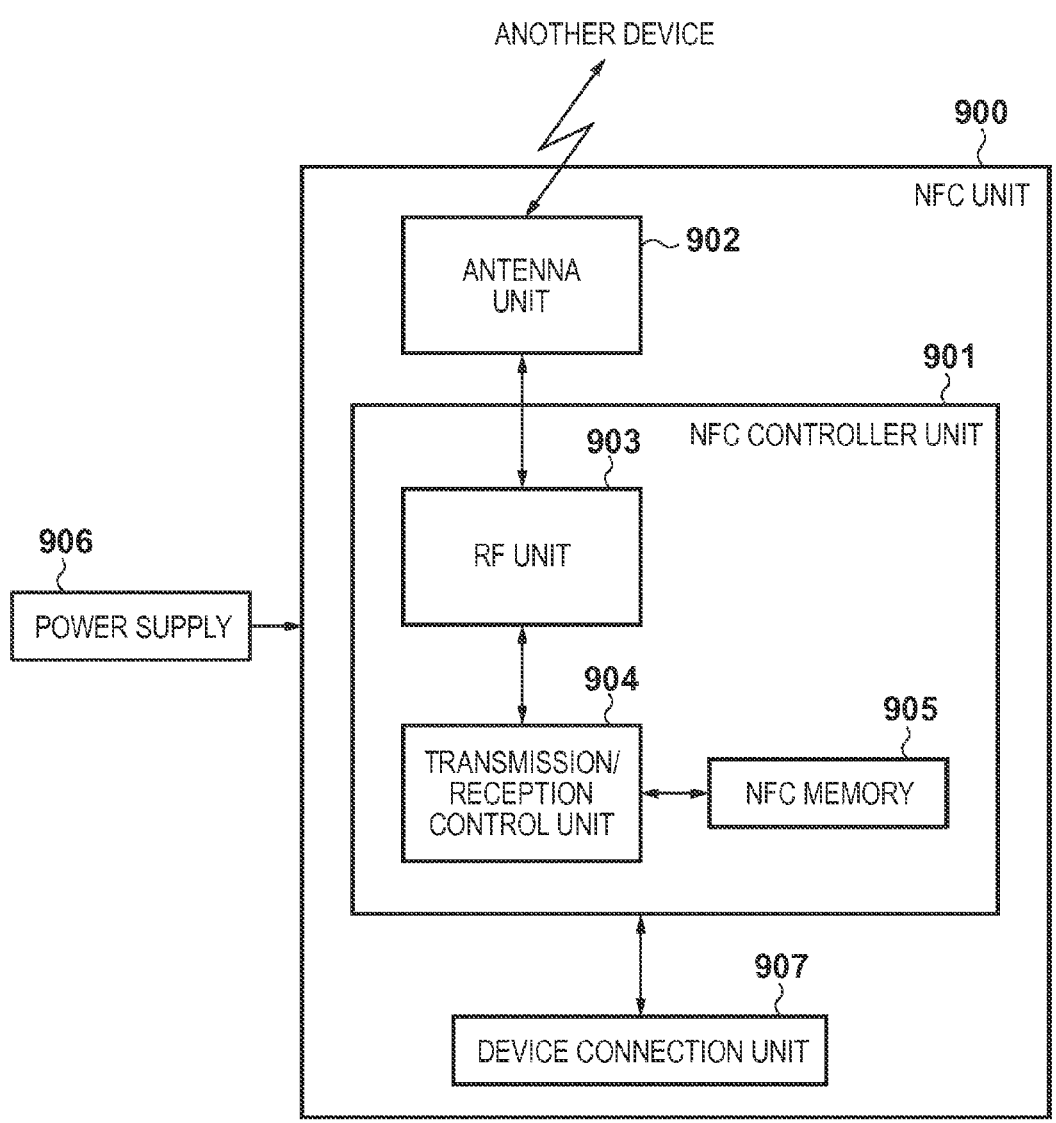

F I G. 10A
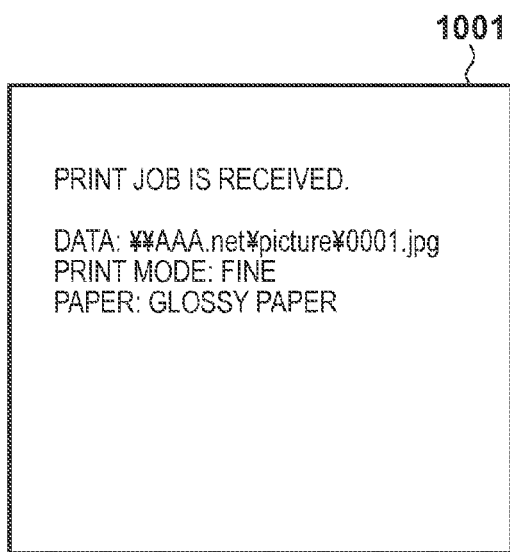
PRINT JOB CONFORMATION SCREEN
F I G. 10B
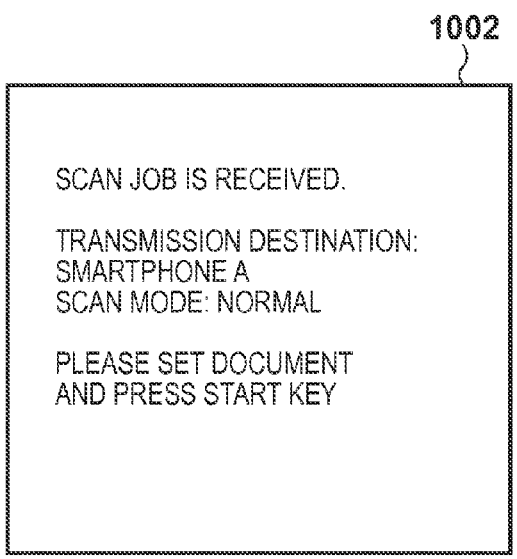
SCAN JOB CONFIRMATION SCREEN

FIG. 17

| CMD 0 | CMD 1 | Byte 0 | Byte 1 | Byte 2 | Byte 3 | ... | Byte n |
|---|---|---|---|---|---|---|---|
| D4 | 06 | PFB | (DID) | (NAD) | DEV_SET_CHG_REQ | | |

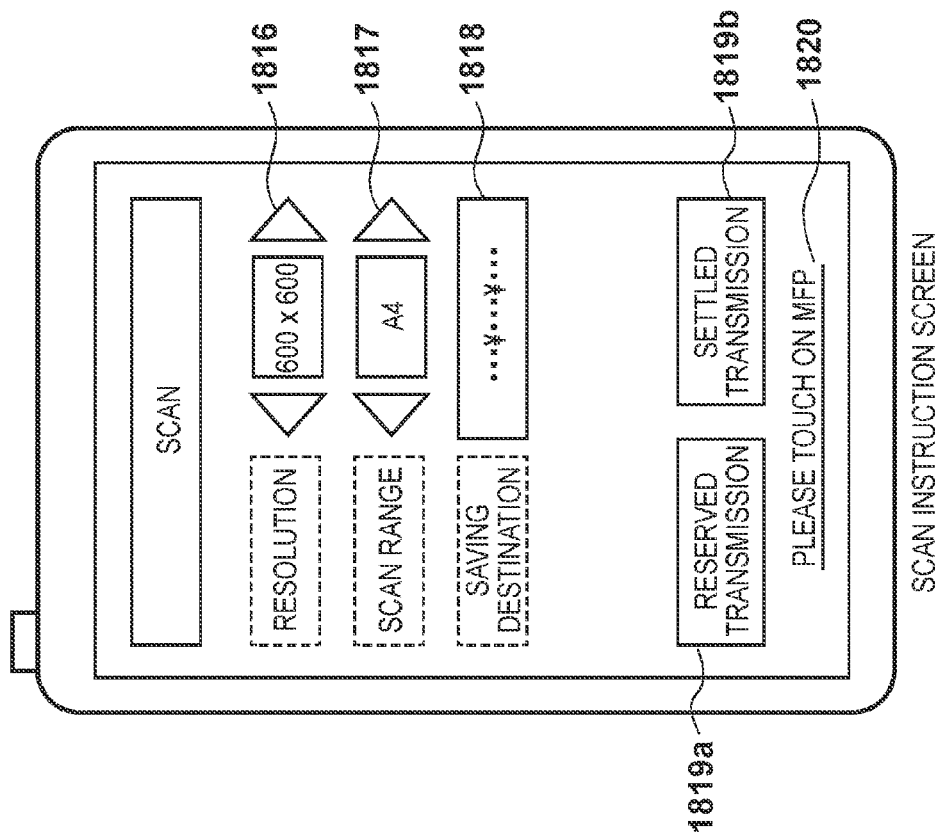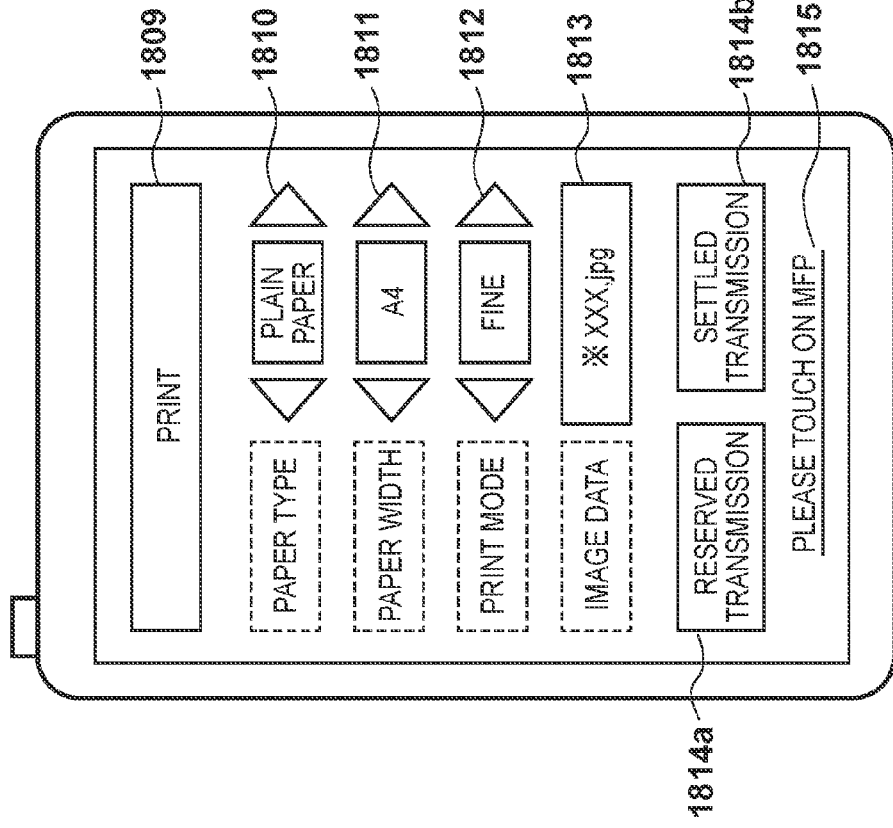

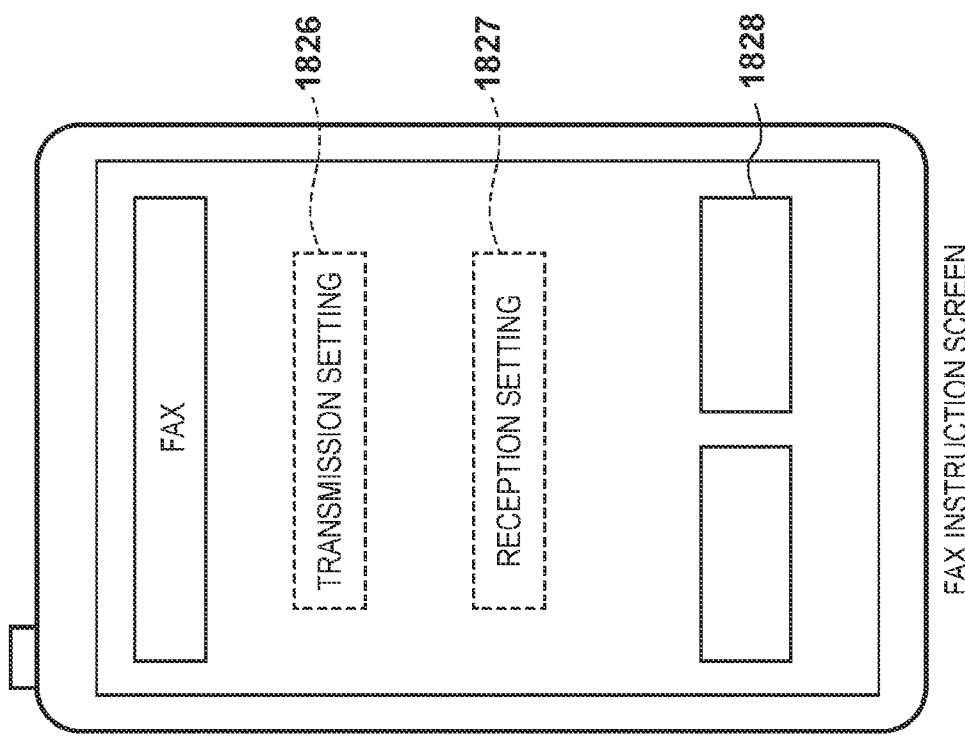
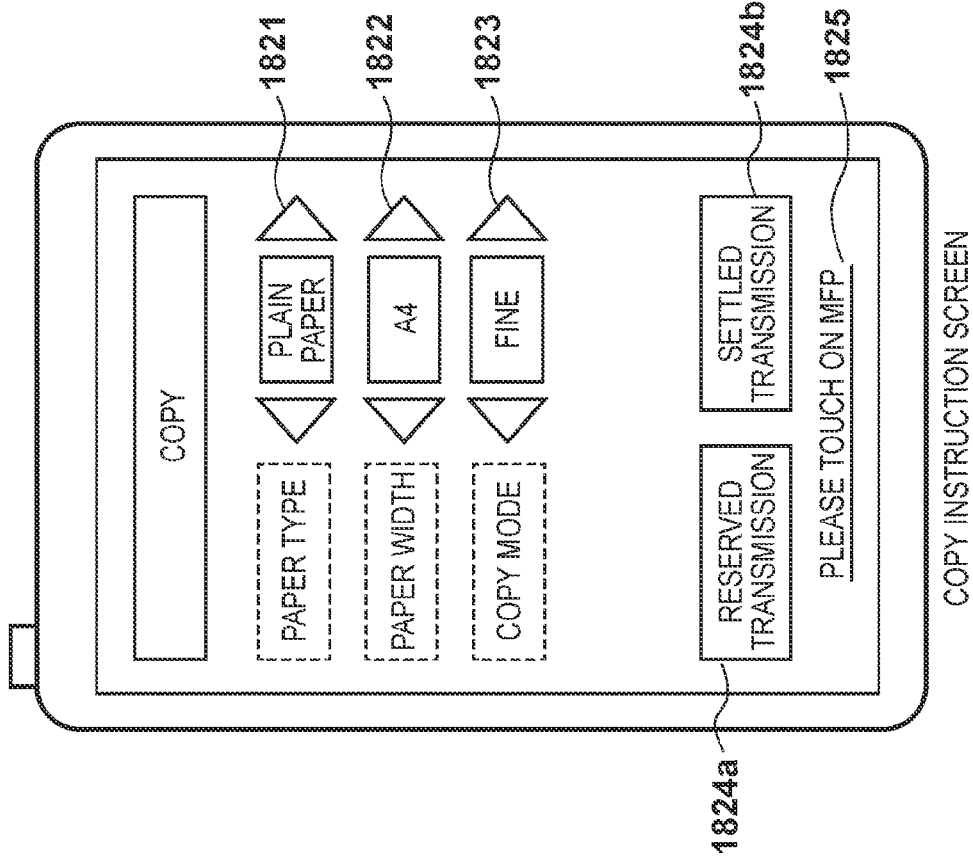

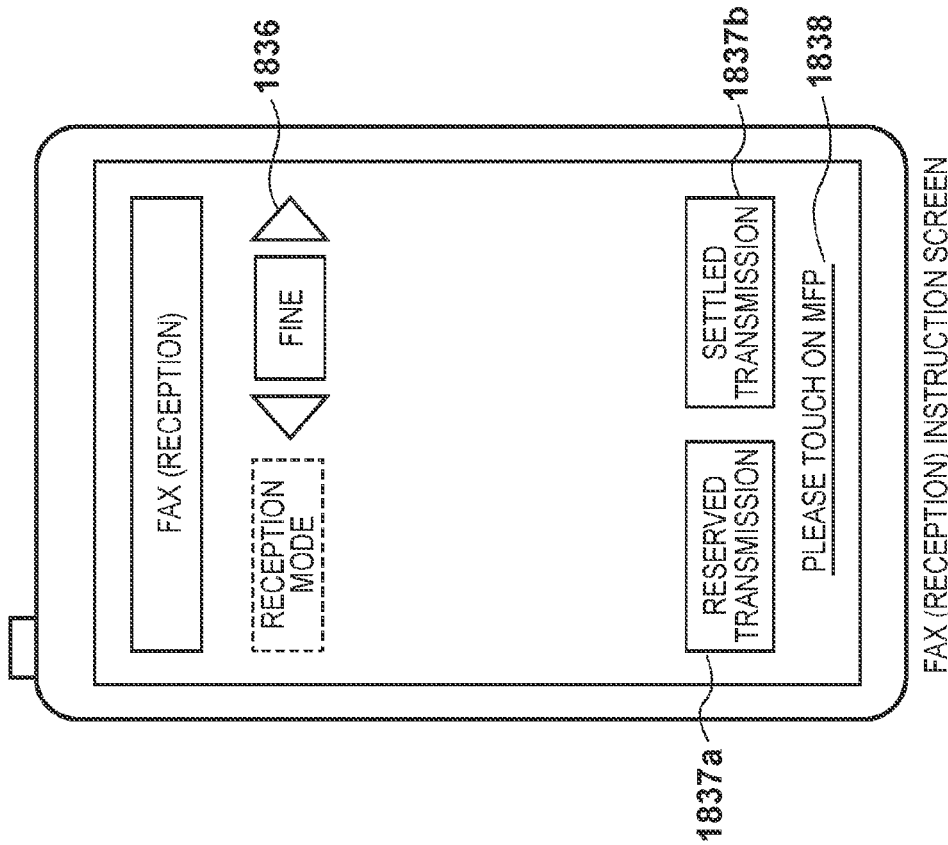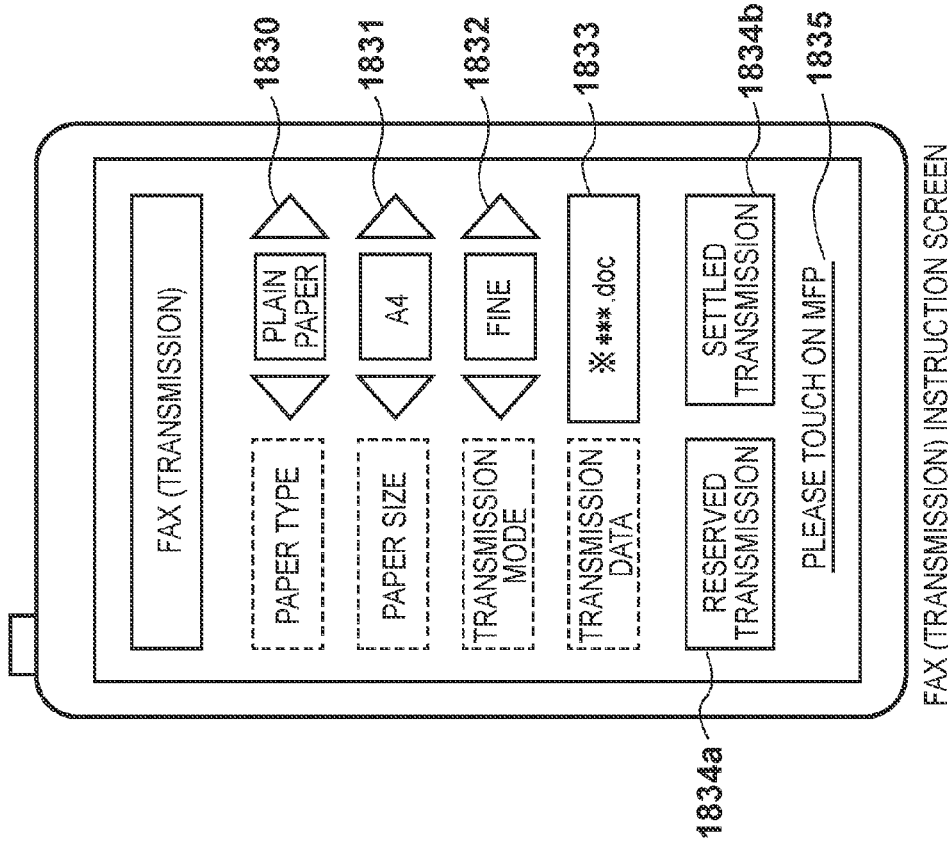

F I G. 18I
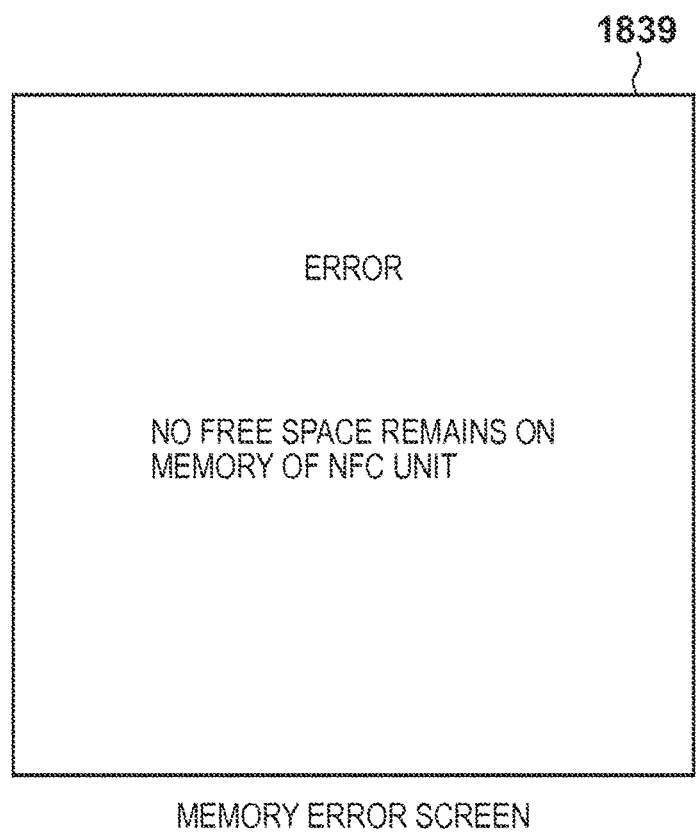
MEMORY ERROR SCREEN

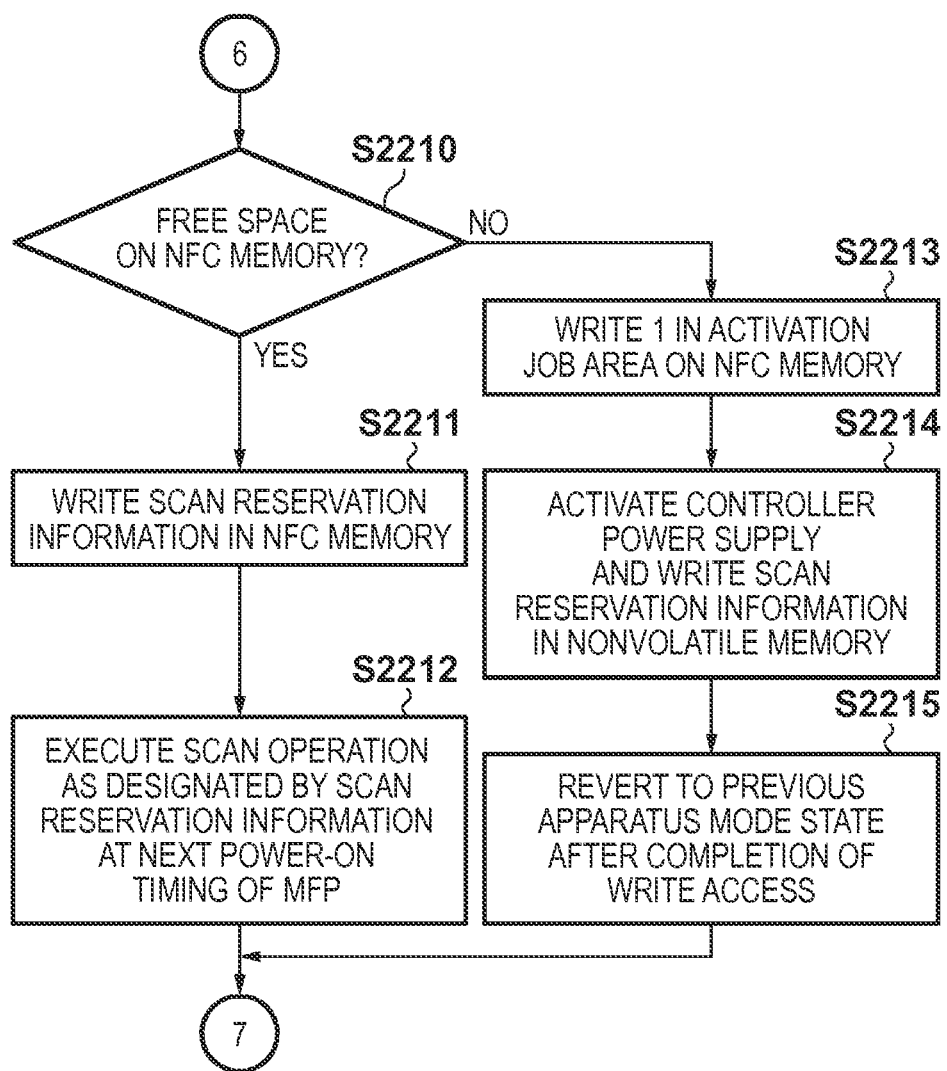

F I G. 23B
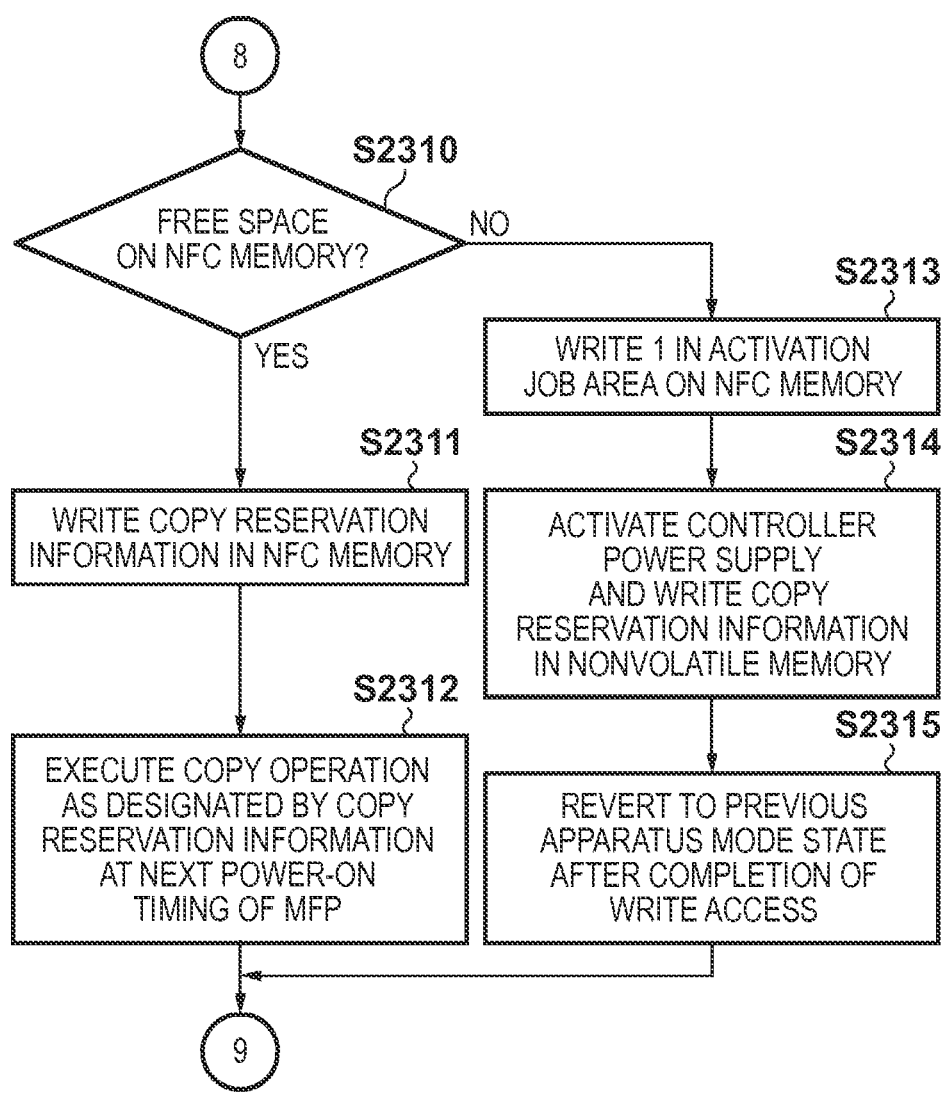

APPARATUS WHICH CAUSES A DEVICE TO PRINT AN IMAGE AFTER COMMUNICATION WITH THE DEVICE VIA A SHORT DISTANCE WIRELESS COMMUNICATION

BACKGROUND OF THE INVENTION

Field of the Invention

The present invention relates to an image processing apparatus and a system which cooperates with that image processing apparatus and, more particularly, to an image processing apparatus capable of communications, and a system which cooperates with that image processing apparatus.

Description of the Related Art

Some printing apparatuses which incorporate a wireless communication system can be switched to a plurality of operation modes according to states and operations. The operation modes include a normal operation mode in which predetermined electric power is supplied, a power saving mode in which electric power lower than the normal operation mode is supplied, a soft power-OFF mode in which electric power lower than the power saving mode is supplied, and an AC-OFF mode in which electric power is not supplied at all.

Japanese Patent Laid-Open No. 2011-44092 discloses an arrangement in which when an NFC device receives a data read/write request for an information processing apparatus in a power saving mode from a communication terminal, the information processing apparatus is activated in response to a request from the NFC device.

A case will be examined wherein in a state in which an NFC device is connected to the aforementioned printing apparatus and the printing apparatus is set in the power saving mode or soft power-OFF mode, and the technique of patent literature 1 is applied. For example, when the printing apparatus in a mode such as the power saving mode, which is different from the normal operation mode, is accessed by the NFC device, electric power is supplied to that apparatus to activate the apparatus so as to exchange data. In this case, since electric power is always supplied to the apparatus to activate that apparatus even in a case in which power activation is not required, wasteful electric power is consumed.

The present invention provides an image processing apparatus which exchanges data with a communication device without wasting consumption power.

SUMMARY OF THE INVENTION

In order to achieve the above object, an image processing apparatus according to the present invention comprises the following arrangement. That is, an apparatus comprising: a communication unit which communicates with a communication device, and is configured to write data received from the communication device in a memory; a storage unit configured to receive an operation request to the apparatus by the communication unit from the communication device, and to store the operation request in the memory; a specifying unit configured to specify a function corresponding to the operation request of a plurality of functions included in the apparatus in a state in which the storage unit stores the operation request in the memory; and a control unit configured to activate, when the specifying unit specifies the function and that function is not activated, the function, and to control the activated function.

According to the present invention, the image processing apparatus can exchange data with the communication device without wasting consumption power.

Further features of the present invention will become apparent from the following description of exemplary embodiments (with reference to the attached drawings).

BRIEF DESCRIPTION OF THE DRAWINGS

FIG. 4 is a view showing an example of an operation unit of the MFP;

FIG. 5A is a conceptual view of a passive mode in NFC communications;

FIG. 5B is a conceptual view of the passive mode in NFC communications;

FIG. 6A is a conceptual view of an active mode in NFC communications;

FIG. 6B is a conceptual view of the active mode in NFC communications;

FIG. 9 is a block diagram showing the detailed arrangement of an NFC unit;

FIG. 10A is a view showing an example of the UI configuration of the MFP;

FIG. 10B is a view showing an example of the UI configuration of the MFP;

FIG. 17 is a table showing an example of a communication packet of a data exchange request;

FIG. 18C is a view showing an example of a UI of the printer application;

FIG. 18D is a view showing an example of a UI of the printer application;

FIG. 18E is a view showing an example of a UI of the printer application;

FIG. 18F is a view showing an example of a UI of the printer application;

FIG. 18G is a view showing an example of a UI of the printer application;

FIG. 18H is a view showing an example of a UI of the printer application;

FIG. 18I is a view showing an example of a UI of the printer application;

FIG. 22B is a flowchart of a scan instruction when a normal operation mode state is not set;

FIG. 23B is a flowchart of a copy instruction when a normal operation mode state is not set;

DESCRIPTION OF THE EMBODIMENTS

Embodiments of the present invention will be exemplarily described in detail hereinafter with reference to the drawings. However, relative layouts of components, display screens, and the like described in the embodiment do not limit the scope of the present invention unless otherwise specified.

This embodiment will explain an example in which a communication apparatus and image processing apparatus exchange data using a short distance wireless communication method, and a startup (power activation) method of the image processing apparatus is changed in response to an operation request of the communication apparatus. More specifically, a technique for making data exchange via short distance wireless communications such as NFC (Near Field Communication), and changing a activation method of the image communication apparatus in response to an operation request of the communication apparatus or according to a state of the apparatus will be described.

Note that the short distance wireless communication means a wireless communication represented by the NFC, a communication range of which is a relatively small predetermined range (for example, 1 m to several cm).

Figure 1:
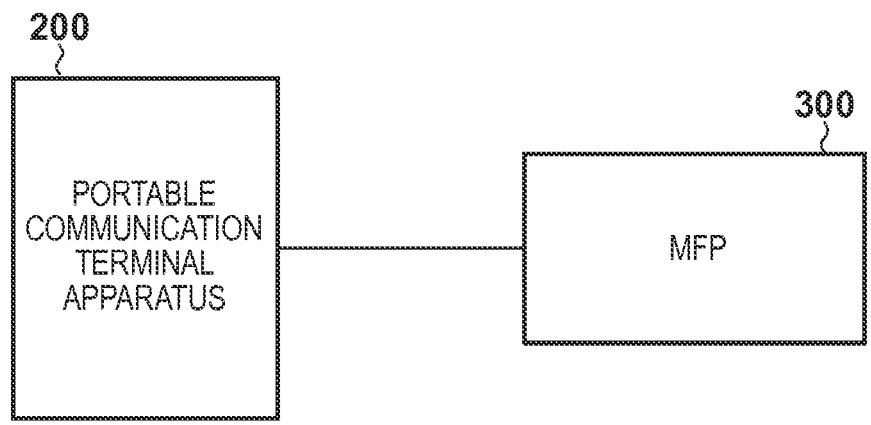
FIG. 1 is a diagram showing an example of the configuration of a wireless communication system.

FIG. 1 shows the configuration of a wireless communication system.

A portable communication terminal apparatus 200 is connected to a multi-function printer (to be abbreviated as an MFP hereinafter) 300 which includes print, scan, FAX, and copy modes as an image processing apparatus. The portable communication terminal apparatus 200 includes at least two types of wireless communication units having different authentication methods and communication speeds. The portable communication terminal apparatus 200 is not particularly limited. For example, a personal information terminal such as a PDA (Personal Digital Assistant), mobile phone, digital camera, and the like may be used as long as they can handle files to be printed.

The MFP 300 includes a reading function of reading a document placed on a platen, and a print function using a printing unit such as an inkjet printer, and may also include a FAX function and telephone function.

Both of the portable communication terminal apparatus 200 and MFP 300 have short distance wireless communication units using the NFC. Even when no electric power is supplied to the portable communication terminal apparatus 200, when the portable communication terminal apparatus 200 is moved closer to the MFP 300 within a predetermined distance range that allows the NFC communications, short distance wireless communications can be made. The MFP 300 may be connected to an external network, personal computer, and display via a communication unit different from the NFC.

Figure 2:
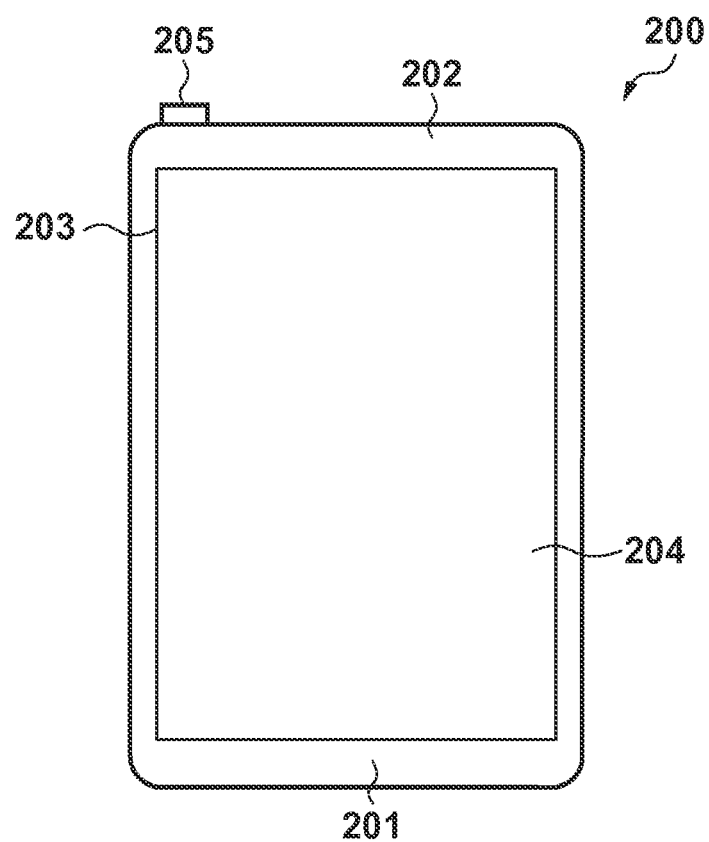
FIG. 2 is a view showing the outer appearance of a portable communication terminal apparatus.

FIG. 2 shows the outer appearance of the portable communication terminal apparatus 200.

This embodiment will exemplify a smartphone. The "smartphone" means a multi-function mobile phone which incorporates a camera, network browser, mail function, and the like in addition to functions of a mobile phone. An NFC unit 201 as a short distance wireless communication unit is a unit required to make communications using the NFC. When the NFC unit 201 is moved closer to a partner NFC unit within a predetermined distance range (for example, about 10 cm), they can communicate with each other in practice.

A WLAN unit 202 is a unit required to make communications via a WLAN, and is arranged inside the portable communication terminal apparatus 200. A display unit 203 is, for example, a display including an LCD type display mechanism. An operation unit 204 includes a touch panel type operation mechanism, and detects pressing information of the user. As a representative operation method, the display unit 203 displays button icons and a software keyboard, and the user presses the operation unit 204, thus issuing a button pressing event. A power key 205 is used to turn on/off a power supply.

Figure 3A:
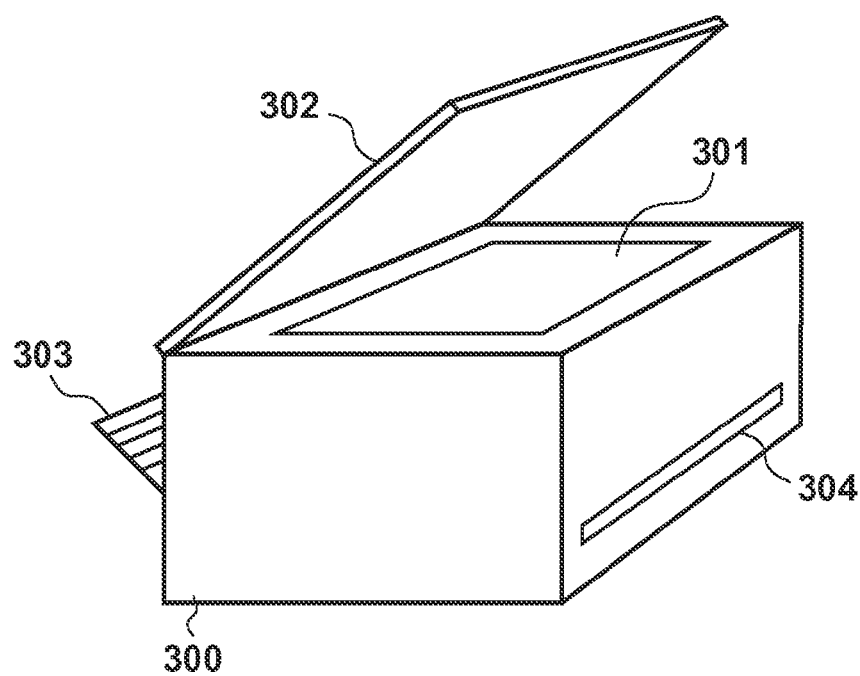
FIG. 3A is a view showing the outer appearance of an MFP.
Figure 3B:
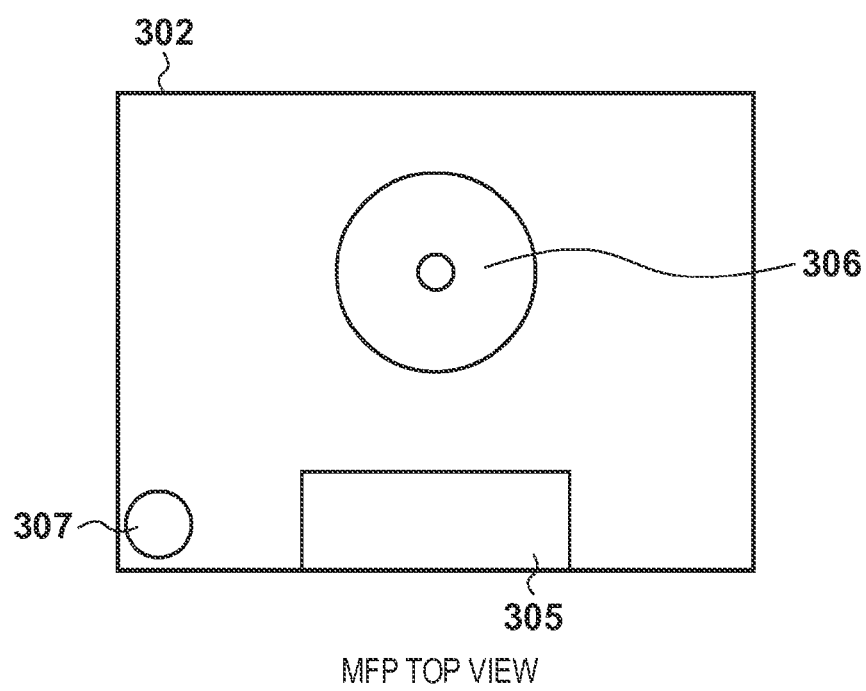
FIG. 3B is a view showing the outer appearance of the MFP.

FIGS. 3A and 3B show the outer appearance of the MFP 300.

This embodiment will exemplify the MFP (Multi Function Printer) having the reading function (scanner). In FIG. 3A, a platen 301 is a glass-like transparent table, which is used to read a document placed on itself using a scanner. A document cover 302 is a cover required to prevent reading light from externally leaking at the time of reading by the scanner. A printing sheet insertion port 303 is an insertion port on which paper sheets of various sizes are set. Paper sheets set on the printing sheet insertion port 303 are conveyed one by one to a printing unit, and are discharged from a printing sheet discharge port 304 after a desired printing operation.

In FIG. 3B, an operation/display unit 305 and NFC unit 306 are arranged on an upper portion of the platen 302. The operation/display unit 305 will be described in detail later with reference to FIG. 4. The NFC unit 306 is a unit required to make short distance wireless communications, and is a place where the portable communication terminal apparatus 200 is approximated to the MFP 300. A predetermined distance (about 10 cm) from the NFC unit 306 is an effective distance of a contact. A WLAN antenna 307 is required to make WLAN communications, and is embedded.

FIG. 4 is a plan view of the operation/display unit 305.

A display unit 406 is a display screen used to display images and a user interface such as an operation menu, and includes, for example, a dot matrix LCD. Arrow keys 401 are used for operations such as cursor movements on the display unit 406. A set key 402 is a key used to make a setting input. A function key 403 is used for operations such as function settings. A start key 404 is used to issue a function execution instruction such as a print start instruction.

The NFC communications will be described below. When proximity communications are made using the NFC units, an apparatus which outputs an RF (Radio Frequency) field first to initiate a communication is called an initiator. Also, an apparatus which responds to a command issued by the initiator to communicate with the initiator is called a target.

A communication mode of the NFC unit includes a passive mode and active mode. In the passive mode, the target responds to a command of the initiator by performing load modulation. On the other hand, in the active mode, the target responds to a command of the initiator by an RF field generated by the target itself.

FIGS. 5A and 5B are conceptual views of the passive mode in the NFC communications.

When data 504 is transmitted from an initiator 501 to a target 502 in the passive mode, as shown in FIG. 5A, the initiator 501 generates an RF field 503. The initiator 501 transmits the data 504 to the target 502 by modulating the RF field 503 by itself.

Also, when data 508 is transferred from a target 506 to an initiator 505 in the passive mode, as shown in FIG. 5B, the initiator 505 generates an RF field 507 in the same manner as in FIG. 5A. The target 506 performs load modulation with respect to the RF field 507, thereby transmitting the data 508 to the initiator 505.

FIGS. 6A and 6B are conceptual views of the active mode in the NFC communications.

When data 604 is transmitted from an initiator 601 to a target 602 in the active mode, as shown in FIG. 6A, the initiator 601 generates an RF field 603. The initiator 601 transmits the data 604 to the target 602 by modulating the RF field 603 by itself. After completion of the data transmission, the initiator 601 stops outputting the RF field 603.

On the other hand, when data 608 is transmitted from a target 608 to an initiator 605 in the active mode, as shown in FIG. 6B, the target 606 generates an RF field 607. The target 606 transmits the data 608 by the RF field 607 generated by itself, and stops outputting the RF field 607 after completion of the transmission.

Figure 7:
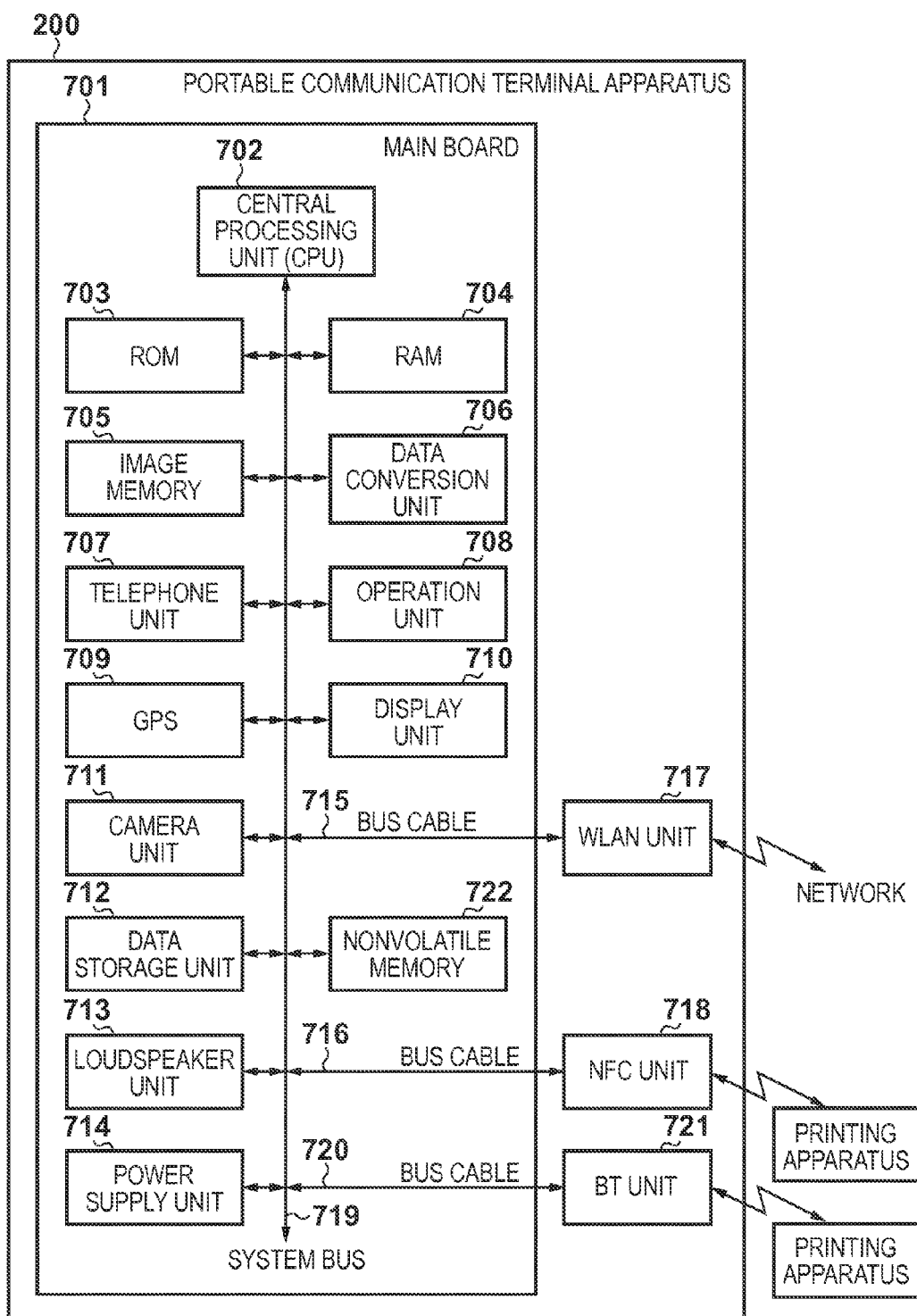
FIG. 7 is a block diagram showing the arrangement of the portable communication terminal apparatus.

FIG. 7 is a block diagram showing the arrangement of the portable communication terminal apparatus 200.

The portable communication terminal apparatus 200 includes a main board 701 which executes main control of the apparatus itself, a WLAN unit 717 which makes WLAN communications, an NFC unit 718 which makes NFC communications, and a BT unit 721 which makes Bluetooth® communications.

In the main board 701, a CPU 702 is a system control unit, and controls the overall portable communication terminal apparatus 200. A ROM 703 stores control programs to be executed by the CPU 702, embedded operating system (OS) program, and the like. In this embodiment, respective control programs stored in the ROM 703 implement software control such as scheduling and task switching under the management of the embedded OS stored in the ROM 703.

A RAM 704 includes an SRAM (Static RAM) or the like, stores data such as program control variables, also stores data such as setting values registered by the user and management data of the portable communication terminal apparatus 200, and is assured with various work buffer areas.

An image memory 705 includes a memory such as a DRAM (Dynamic RAM), and temporarily stores image data received via a communication unit and those which are read out from a data storage unit 712 so as to be processed by the CPU 702. In this case, the communication unit is a collective term of communication functions including the WLAN unit 717, NFC unit 718, and BT unit 721.

A nonvolatile memory 722 includes a memory such as a flash memory, and stores data to be saved even after power-OFF. Such data include, for example, an address book, mail history, incoming/outgoing call history, previously connected device information, and the like. Note that such memory configuration is not limited to this. For example, the image memory 705 and RAM 704 may be shared, or data may be backed up in the data storage unit 712. In this embodiment, the DRAM is used as the image memory 705. However, the present invention is not limited to this since other storage media such as a hard disk and nonvolatile memory may be used.

A data conversion unit 706 executes analysis of a page description language (PDL) and the like, and data conversion such as color conversion and image conversion. A telephone unit 707 controls a telephone line, and realizes telephone communications by processing audio data input/output via a loudspeaker unit 713. An operation unit 708 controls signals of the operation unit 204 (FIG. 2). A GPS (Global Positioning System) 709 acquires position information such as the current latitude and longitude. A display unit 710 electronically controls the display contents of the display unit 203 (FIG. 2), allows various input operations, and can display operation states, status conditions, and the like of the MFP 300.

A camera unit 711 has a function of digitally recording and encoding an image input via a lens. An image captured by the camera unit 711 is saved in the data storage unit 712. The loudspeaker unit 713 realizes a function of inputting or outputting a speech for a telephone function, and also an alarm notification function and the like. A power supply unit 714 is a portable battery, and executes power supply control in the apparatus. A power supply state includes an out-of-battery state in which the battery has no remaining amount, a power-OFF state in which the power key 205 is not pressed, a activation state in which the apparatus is normally activated, and a power saving state in which the apparatus is activated but is set in a power saving mode.

The portable communication terminal apparatus 200 incorporates three communication units required to make wireless communications, and can make WLAN, NFC, and Bluetooth® wireless communications. Thus, the portable communication terminal apparatus 200 makes data communications with another device such as an MFP. This communication unit converts data into packets, and makes packet transmission to the other device. Conversely, the communication unit converts packets coming from another external device into data, and transmits the data to the CPU 702. The WLAN unit 717, NFC unit 718, and BT unit 721 are connected to the main board 701 respectively via bus cables 715, 716, and 720. The WLAN unit 717, NFC unit 718, and BT unit 721 are units required to attain communications compliant with the standards. Details of the NFC unit will be described later with reference to FIG. 9.

The respective components 703 to 714, 717, 718, 721, and 722 in the main board 701 are connected to each other via a system bus 719 managed by the CPU 702.

Figure 8:
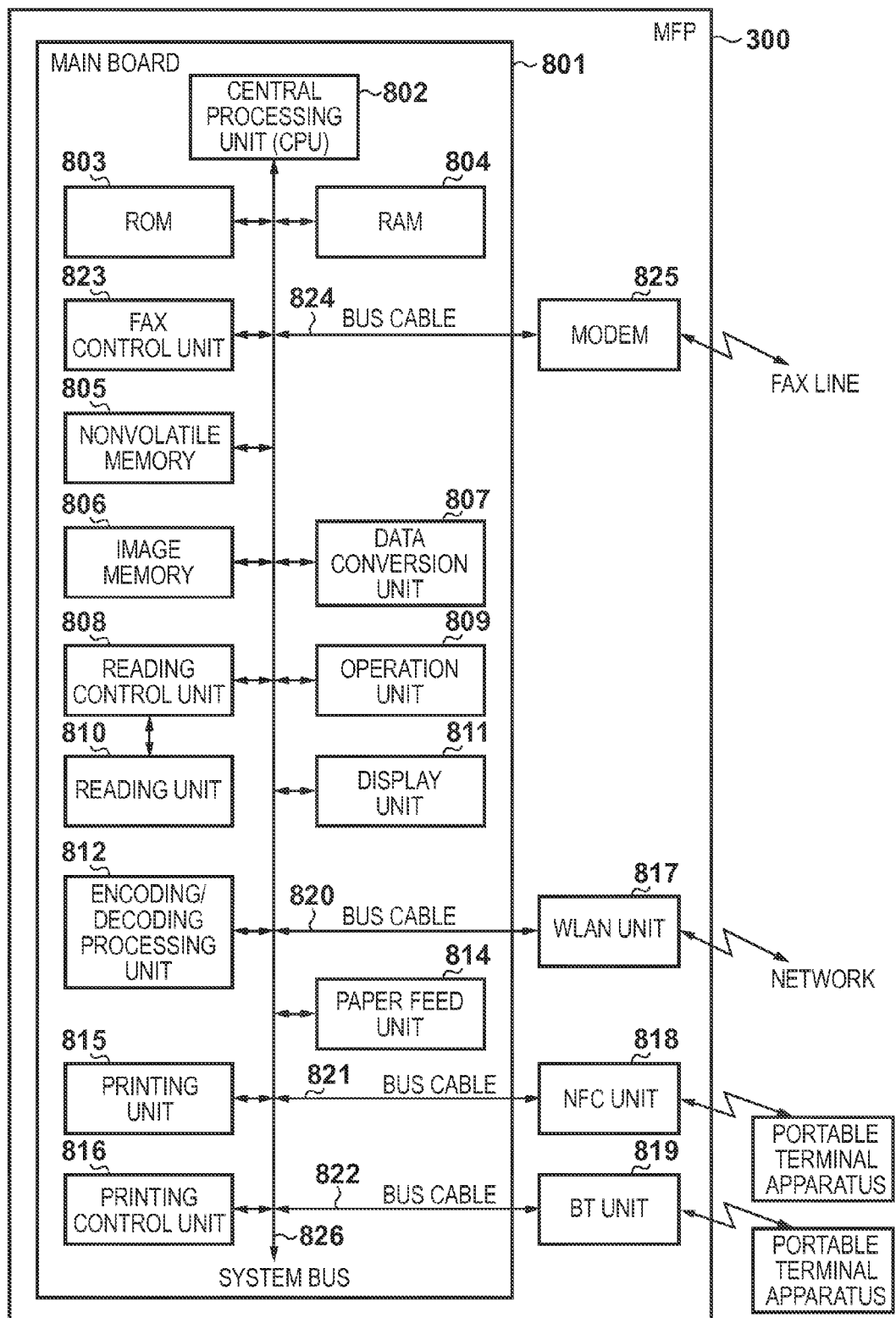
FIG. 8 is a block diagram showing the arrangement of the MFP.

FIG. 8 is a block diagram showing the arrangement of the MFP 300.

The MFP 300 includes a main board 801 which executes main control of the apparatus itself, a WLAN unit 817 which makes WLAN communications, an NFC unit 818 which makes NFC communications, and a BT unit 819 which makes Bluetooth® communications.

In the main board 801, the CPU 802 is a system control unit, and controls the overall MFP 300. A ROM 803 stores control programs to be executed by the CPU 802, an embedded operating system (OS) program, and the like. In this embodiment, respective control programs stored in the ROM 803 implement software control such as scheduling and task switching under the management of the embedded OS stored in the ROM 803. A RAM 804 includes an SRAM (Static RAM), stores data such as program control variables, stores data such as setting values registered by the user and management data of the MFP 300, and is assured with various work buffer areas.

A nonvolatile memory 805 includes a memory such as a flash memory, and stores data to be held even after power-OFF. More specifically, such data include network connection information, user data, and the like. An image memory 806 includes a memory such as a DRAM (Dynamic RAM), and stores image data received via a communication unit, those processed by an encoding/decoding processing unit 812, and those acquired via a memory card controller 516. Also, as in the memory configuration of the portable communication terminal apparatus 200, the present invention is not limited to such specific memory configuration. A data conversion unit 807 executes analysis of a page description language (PDL) and the like, conversion from image data into print data, and the like.

Note that the communication unit is a collective term of communication functions including the WLAN unit 817, NFC unit 818, and BT unit 819.

A reading control unit 808 controls a reading unit 810 to optically read a document by, for example, a CIS sensor (contact image sensor). Next, the reading control unit 808 applies various kinds of image processing such as binarization processing and halftone processing to an image signal converted into electrical image data via an image processing control unit (not shown), thereby outputting high-resolution image data.

An operation unit 809 and display unit 811 correspond to the operation/display unit 305 in FIG. 4. The encoding/decoding processing unit 812 executes encoding/decoding processing and enlargement/reduction processing of image data (JPEG, PNG, etc.) handled by the MFP 300. A paper feed unit 814 holds paper sheets used in printing. A paper sheet can be fed from the paper feed unit 814 under the control of a printing control unit 816. Especially, as the paper feed unit 814, a plurality of paper feed units can be prepared so as to hold a plurality of types of paper sheets in one apparatus. Then, the printing control unit 816 can control to select a paper feed unit used to supply paper sheets.

The printing control unit 816 applies various kinds of image processing such as smoothing processing, printing density correction processing, and color correction to image data to be printed via an image processing control unit (not shown) to convert that image data into high-resolution image data, and outputs the converted data to a printing unit 815. The printing control unit 816 also assumes a role of periodically reading out information of the printing unit 815, and updating information in the RAM 804. More specifically, the printing control unit 816 updates status information such as the remaining amount of an ink tank and a printhead state.

The MFP 300 also incorporates three communication units required to make wireless communications as in the portable communication terminal apparatus 200, and a description of these communication units will not be repeated since their functions are the same. In this case, the WLAN unit 817, NFC unit 818, and BT unit 819 are connected to the main board 801 respectively via bus cables 820, 821, and 822.

Respective components 802 to 819 in the main board 801 are connected to each other via a system bus 823 managed by the CPU 802.

FIG. 9 is a block diagram showing details of an NFC unit used in the NFC unit 718 or 818.

FIG. 9 will explain the NFC unit 718 (FIG. 7) or NFC unit 818 (FIG. 8) as an NFC unit 900. The NFC unit 900 includes an NFC controller unit 901, antenna unit 902, RF unit 903, transmission/reception control unit 904, NFC memory 905, power supply 906, and device connection unit 907.

The antenna unit 902 receives electromagnetic waves and carriers from another NFC device (a device incorporating an NFC unit), and transmits electromagnetic waves and carriers to another NFC device. The RF unit 903 has a function of modulating/demodulating an analog signal to a digital signal. The RF unit 903 includes a synthesizer, and controls bands and channels based on frequency assigned data by identifying frequencies of bands and channels.

The transmission/reception control unit 904 executes control associated with transmission/reception such as assembling/disassembling of transmission/reception frames, appending and detection of a preamble, and frame identification. Also, the transmission/reception control unit 904 controls the NFC memory 905 to read/write various data and programs. When the NFC unit operates in the active mode, it receives electric power via the power supply 906 to communicate with a device via the device connection unit 907 and to communicate with another NFC device located within a communication range by carriers (or electromagnetic waves) transmitted/received via the antenna unit 902. When the NFC unit operates in the passive mode, it receives carriers (or electromagnetic waves) from another NFC device via the antenna unit 902 to electric power from that NFC device by electromagnetic induction, and exchanges data via communications with that NFC device by modulating carriers (or electromagnetic waves).

FIGS. 10A and 10B show display examples on the display unit 406 of the MFP 300.

When a print job is received from the portable communication terminal apparatus 200, a print job confirmation screen 1001 is displayed on the display unit 406. When a scan job is received, a scan job confirmation screen 1002 is displayed.

Figure 11:
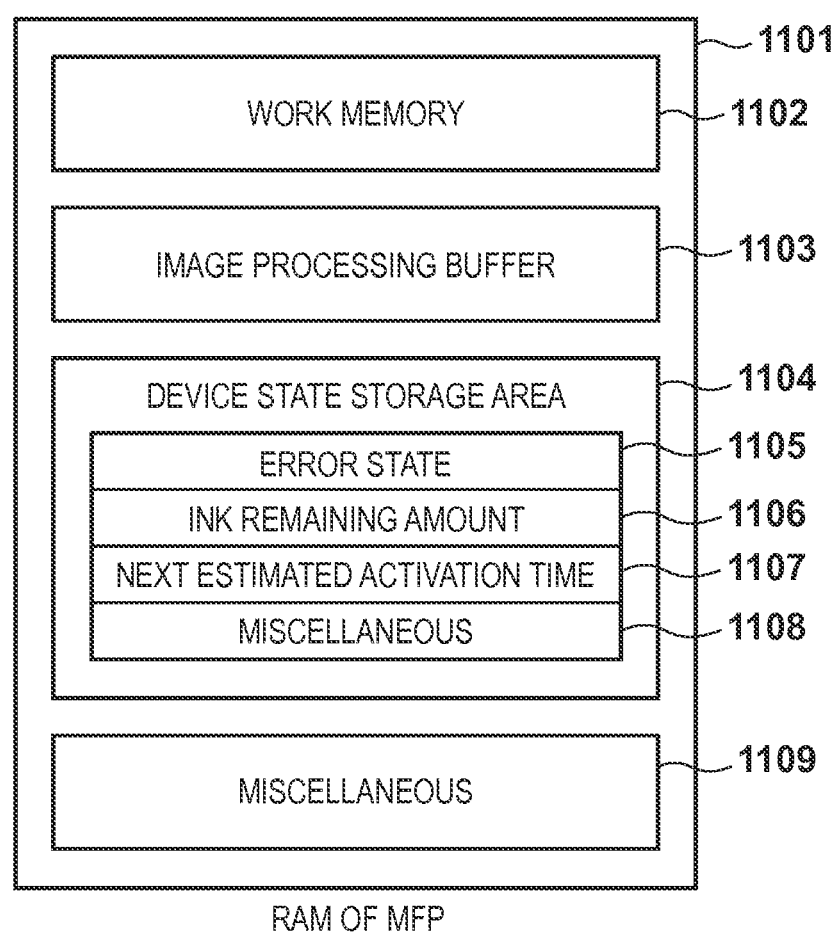
FIG. 11 is a view showing the configuration of a RAM of the MFP.

FIG. 11 shows the configuration of the RAM 804 of the MFP 300.

Reference numeral 1101 denotes an entire storage area of the RAM 804. A work memory 1102 is a memory area assured to execute programs. An image processing buffer 1103 is an area used as a temporary buffer for image processing.

A device state storage area 1104 stores various kinds of information associated with the current state of the MFP 300. In this case, various kinds of information include an error state 1105, ink remaining amount 1106, next estimated activation time 1107, and miscellaneous 1108.

The error state 1105 stores states associated with errors of the MFP 300. Such errors include a low-ink alert, out-of-ink error, paper jam error, out-of-paper alert, printed image defect alert, read image defect error, network disconnection alert, and the like. These alerts and errors are associated with degrees of influence on a printing function, degrees of influence on a reading function, and the like. For example, in case of an out-of-ink error, the printing function is not available, but the reading function is available. In case of a network disconnection alert, functions using a network are not available, but setting changes and the reading functions to be performed by the apparatus alone are available.

The ink remaining amount 1106 stores a model number and ink remaining amount of a currently attached ink tank. The model number of the ink tank is updated at an attachment timing of that ink tank. The ink remaining amount 1106 is updated every time ink is used.

The next estimated activation time 1107 stores an estimated activation time of the next activation timing when the power supply is turned off. The activation time of the MFP 300 largely varies depending on states. For example, a power supply state of the MFP 300 includes a hard OFF state, soft OFF state, normal activation state, sleep state, and the like. In the hard OFF state, no electric power is supplied, and when the power supply is turned on to change the hard OFF state to the normal activation state, a long time is required. In the soft OFF state, electric power is supplied to some units, but a main program is not running. In this state, the apparatus can be activated to require a shorter time than the hard OFF state. In the sleep state, since no electric power is supplied to units which require large power consumption, but other programs and mechanisms are active, the normal activation state can be restored quickly. Another variation factor of the activation time includes error states of the apparatus. For example, when many clogged nozzles of an inkjet printhead are detected, the apparatus is activated for the next time after recovery processing for a long time. When the light amount of the scanner is reduced, the apparatus is activated after an adjustment operation. In this manner, the estimated activation time at the next activation timing is decided depending on the state transition of the power supply and the state of the apparatus.

The miscellaneous 1108 stores other device states such as the current memory use amount, hardware temperature, and expendable information. A miscellaneous 1109 stores data other than aforementioned data.

Figure 12:
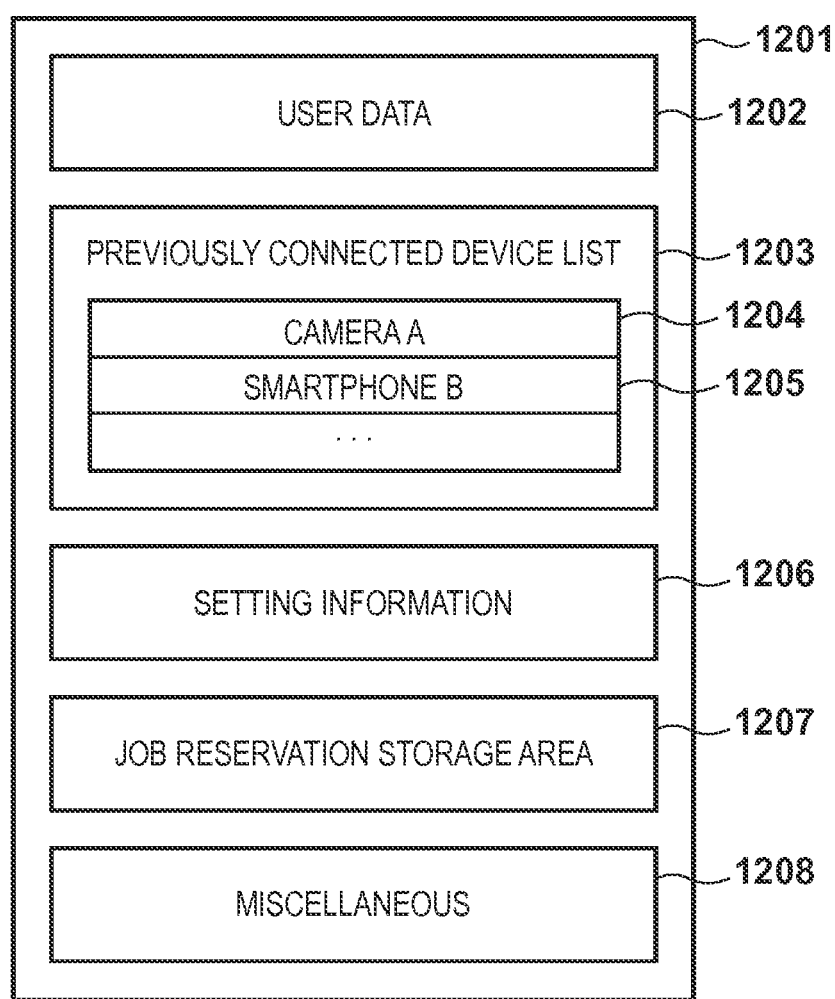
FIG. 12 is a view showing the configuration of a nonvolatile memory of the MFP.

FIG. 12 shows the configuration of the nonvolatile memory 805 of the MFP 300.

Reference numeral 1201 denotes an overall storage area of the nonvolatile memory 805. User data 1202 stores information associated with the user, and stores, for example, a FAX telephone number, communication history, network information, and the like. A previously connected apparatus list 1203 stores a list of apparatuses to which the MFP 300 was connected so far.

For example, when the MFP 300 communicated with a smartphone via the NFC, the list 1203 stores an identifier of the smartphone. When the MFP 300 was P2P (peer-to-peer)-connected to a smartphone via the WLAN, the list 1203 stores identification information required for connection via the WLAN. More specifically, when WPS (Wi-Fi Protected Setup) is used for the WLAN connection, the list 1203 stores WPS Credential authentication information. When the MFP 300 was connected to a smartphone via Bluetooth, the list 1203 stores OOB authentication information. When the MFP 300 was connected to a server apparatus via a LAN, the list 1203 stores network information of the server apparatus. Setting information 1206 stores setting information of the MFP 300. The setting information includes, for example, menu items such as a print mode, correction information of the inkjet printhead, and the like. A job reservation storage area 1207 saves print reservation information, scan reservation information, and the like, which are copied from the NFC memory 905 of the NFC unit 900. A miscellaneous 1208 stores other kinds of nonvolatile information.

Figure 13:
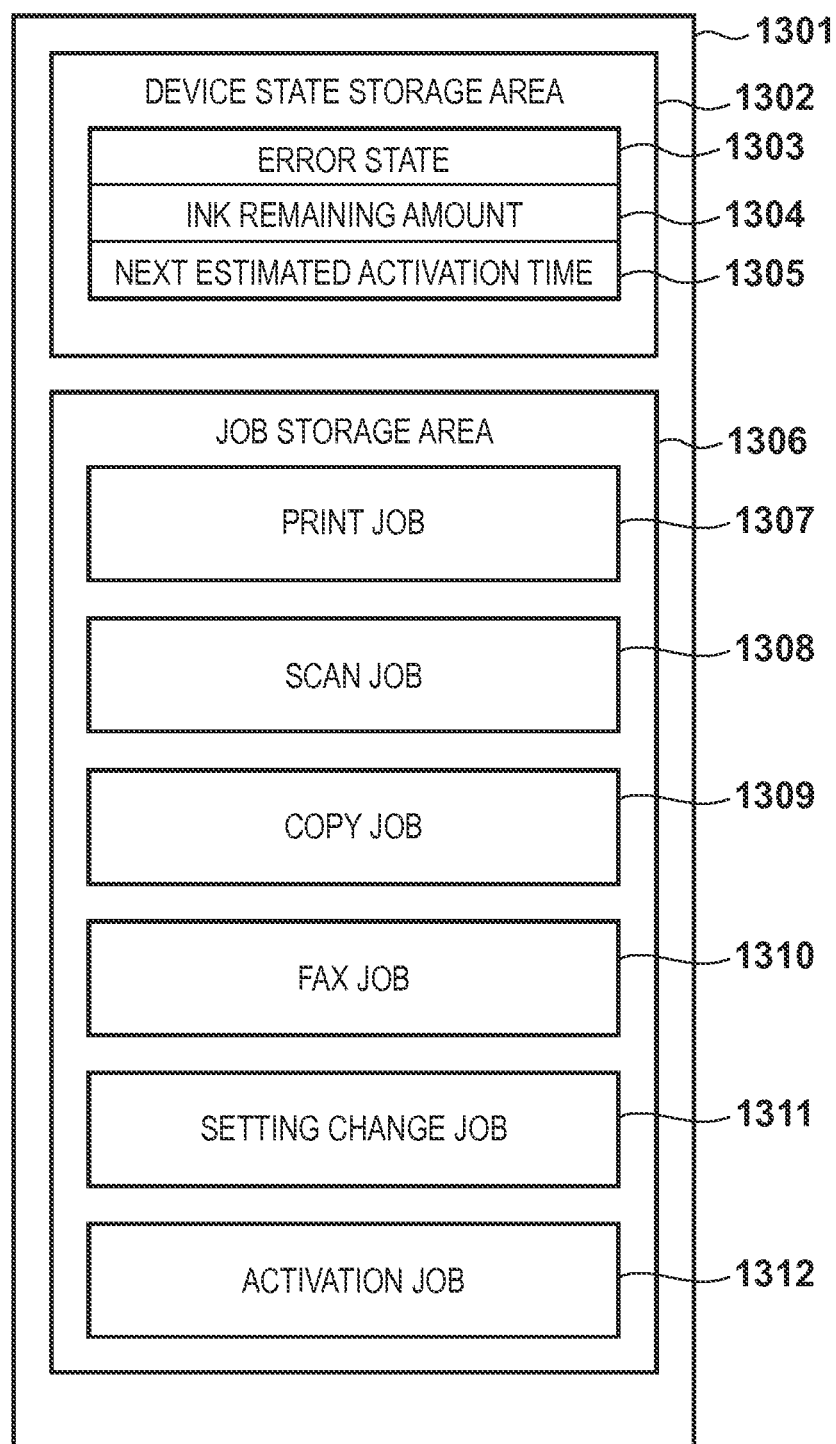
FIG. 13 is a view showing the configuration of an NFC memory of the MFP.

FIG. 13 shows the configuration of the NFC memory 905 of the MFP 300.

Reference numeral 1301 denotes an overall storage area of the NFC memory 905 of the MFP 300. To a device state storage area 1302, the contents of the device state storage area 1104 (FIG. 11) are copied at a predetermined timing. In FIG. 13, an error state 1303, ink remaining amount 1304, and next estimated activation time 1305 respectively correspond to the error state 1105, ink remaining amount 1106, and next estimated activation time 1107 shown in FIG. 11.

Note that in this embodiment, operation mode information indicating a current operation mode of the apparatus of a plurality of types of operation modes is stored and managed in the next estimated activation time 1305. The operation modes include a normal operation mode in which predetermined electric power is supplied, a power saving mode in which electric power to be supplied is lower than that in the normal operation mode, a soft power-OFF mode in which electric power to be supplied is lower than that in the power saving mode, and an AC-OFF mode (power-OFF mode) in which no electric power is supplied. In this case, since the power saving mode and soft power-OFF mode are common in the sense of a standby state mode in which electric power of a main power supply (normal operation mode) of the apparatus is not supplied and consumption power is low, both these modes are standby power modes.

A job storage area 1306 is used when the portable communication terminal apparatus 200 inputs a job to the MFP 300 via the NFC. A print job 1307 is a queue which stores print jobs. More specifically, the print job 1307 stores print settings and link destinations to images. A scan job 1308 is a queue which stores scan jobs. More specifically, the scan job 1308 stores reading settings. A copy job 1309 is a queue which stores copy jobs. More specifically, the copy job 1309 stores copy settings. A FAX job 1310 is a queue which stores FAX jobs. More specifically, the FAX job 1310 stores FAX settings including telephone numbers of transmission destinations, communication image qualities, and the like, and link destinations to images when images have already been read.

A setting change job 1311 is a queue which stores setting change jobs. More specifically, the setting change job 1311 stores jobs associated with changes of setting items of the MFP 300 main body. An activation job area 1312 stores activation information. More specifically, the activation job area 1312 stores information indicating a unit (function: a print function, reading function, FAX function, telephone function, or the like) to be activated of the MFP 300. In this case, the activation job area 1312 is a fixed storage area, which is assured in advance, and allows data read/write accesses regardless of the free capacity of the NFC memory.

Figure 14:
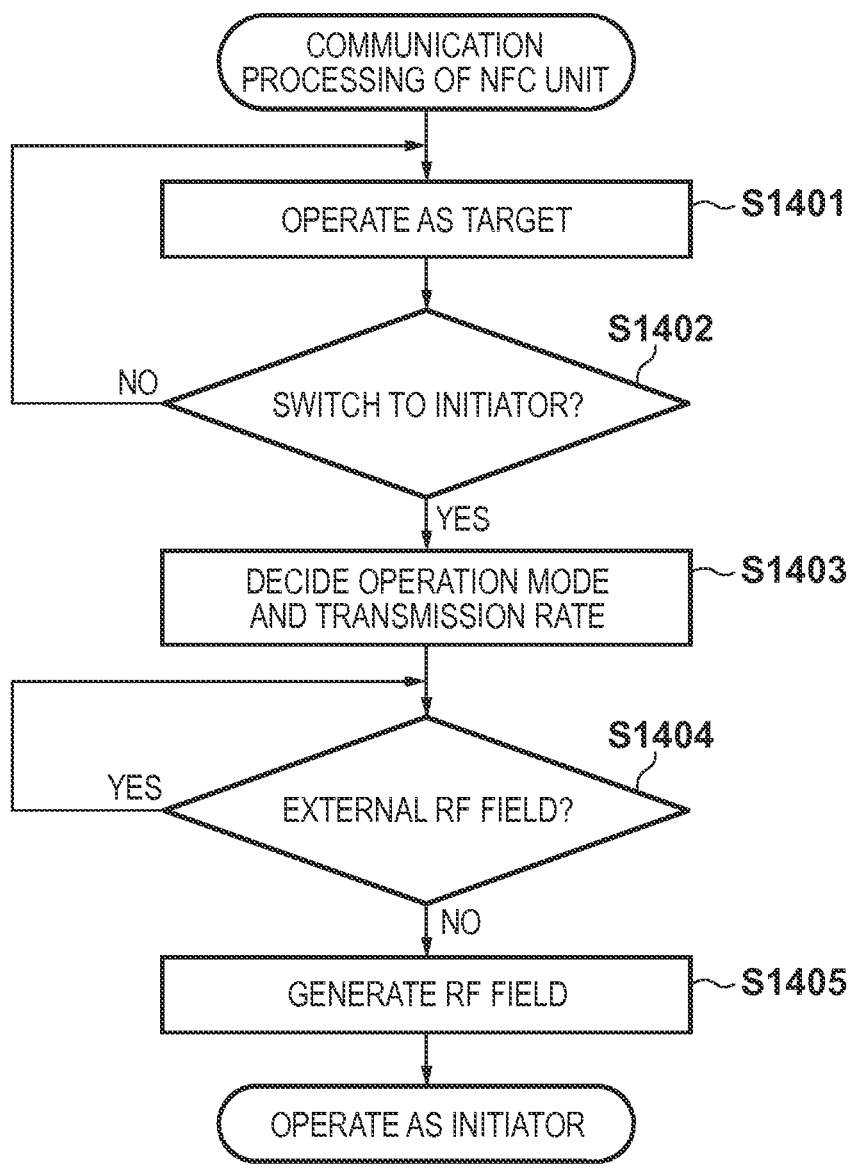
FIG. 14 is a flowchart required for the NFC unit to operate as an initiator.

FIG. 14 is a flowchart required for the NFC unit 900 to operate as an initiator.

Initially, in step S1401, all NFC units 900 operate as a target, and are set in a waiting state of a command from an initiator. In this case, each NFC unit 900 can be switched to an initiator in response to a request from an application, which controls communications based on the NFC standard. Then, the application determines in step S1402 whether or not the NFC unit 900 is switched to an initiator. If the NFC unit 900 is not switched to an initiator (NO in step S1402), the process returns to step S1401. On the other hand, if the NFC unit 900 is switched to an initiator in response to a switching request to an initiator (YES in step S1402), the process advances to step S1403.

In step S1403, the application of the NFC unit 900 selects one of the active mode and passive mode as an operation mode, and decides a transmission rate. Next, in step S1404, the NFC unit 900 as the initiator detects an RF field generated by a device other than the self unit. That is, the NFC unit 900 determines whether or not an external RF field is detected. If an external RF field is detected (YES in step S1404), the initiator waits until no RF field is detected without generating a self RF field. On the other hand, if no external RF field is detected (NO in step S1404), the process advances to step S1405, and the NFC unit 900 as the initiator generates a self RF field. Via the aforementioned steps, the NFC unit 900 begins to operate as the initiator.

Figure 15:
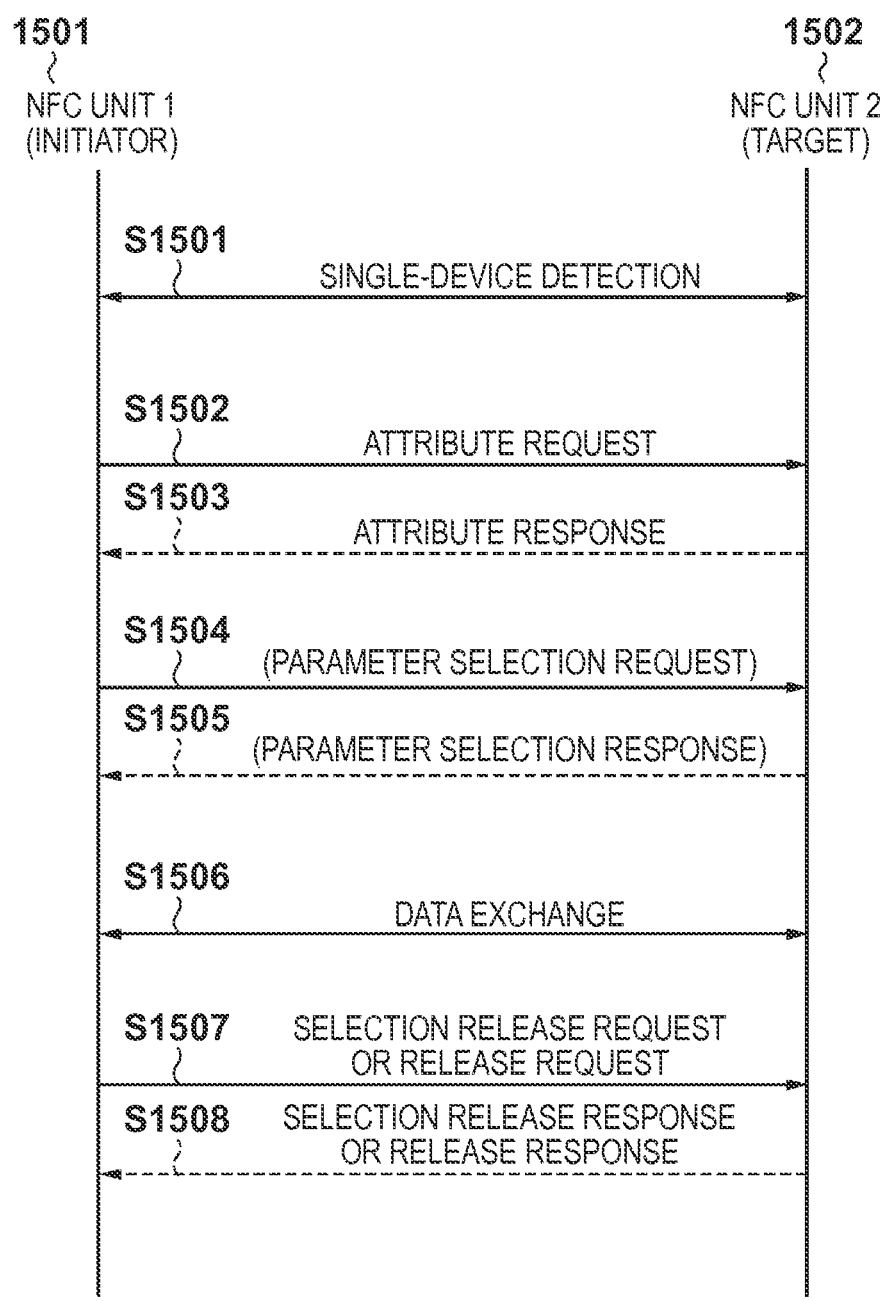
FIG. 15 is a chart showing the data exchange sequence in the passive mode.

FIG. 15 is a sequence chart of data exchange in the passive mode.

A case will be described below wherein a first NFC unit 1501 operates as an initiator, and a second NFC unit 1502 operates as a target.

In step S1501, the first NFC unit 1501 executes single-device detection to specify the second NFC unit 1502. Next, in step S1502, the first NFC unit 1501 transmits a self identifier, a bit transmission rate of transmission/reception, a valid data length, and the like as an attribute request. The attribute request has general bytes, and can be arbitrarily selected and used.

When the second NFC unit 1502 receives a valid attribute request, it transmits an attribute response in step S1503. In this case, transmission from the second NFC unit 1502 is attained by load modulation, and data transmission by means of load transmission is expressed by a dotted line arrow in FIG. 15.

In step S1504, after the first NFC unit 1501 confirms a valid attribute response, it transmits a parameter selection request to continuously change parameters of a transmission protocol. Parameters included in the parameter selection request are a transmission rate and valid data length.

When the second NFC unit 1502 receives a valid parameter selection request, it transmits a parameter selection response in step S1505, and changes the parameters. Note that steps S1504 and S1505 may be omitted if parameters are not changed.

In step S1506, the first and second NFC units 1501 and 1502 exchange data by a data exchange request and data exchange response. The data exchange request and response can transmit information for applications included in communication partners as data, and can divisionally transmit information when a data size is large.

Upon completion of data exchange, the first NFC unit 1501 transmits either a selection release request or release request in step S1507. When the first NFC unit 1501 transmits the selection release request, the second NFC unit 1502 transmits a selection release response in step S1508. Upon reception of the selection release request, the first NFC unit 1501 releases the attributes indicating the second NFC unit 1502, and the process returns to step S1501. When the first NFC unit 1501 transmits a release request, the second NFC unit 1502 transmits a release response and returns to an initial state in step S1508. When the first NFC unit 1501 receives the release response, it may return to an initial state since the target is completely released.

Figure 16:
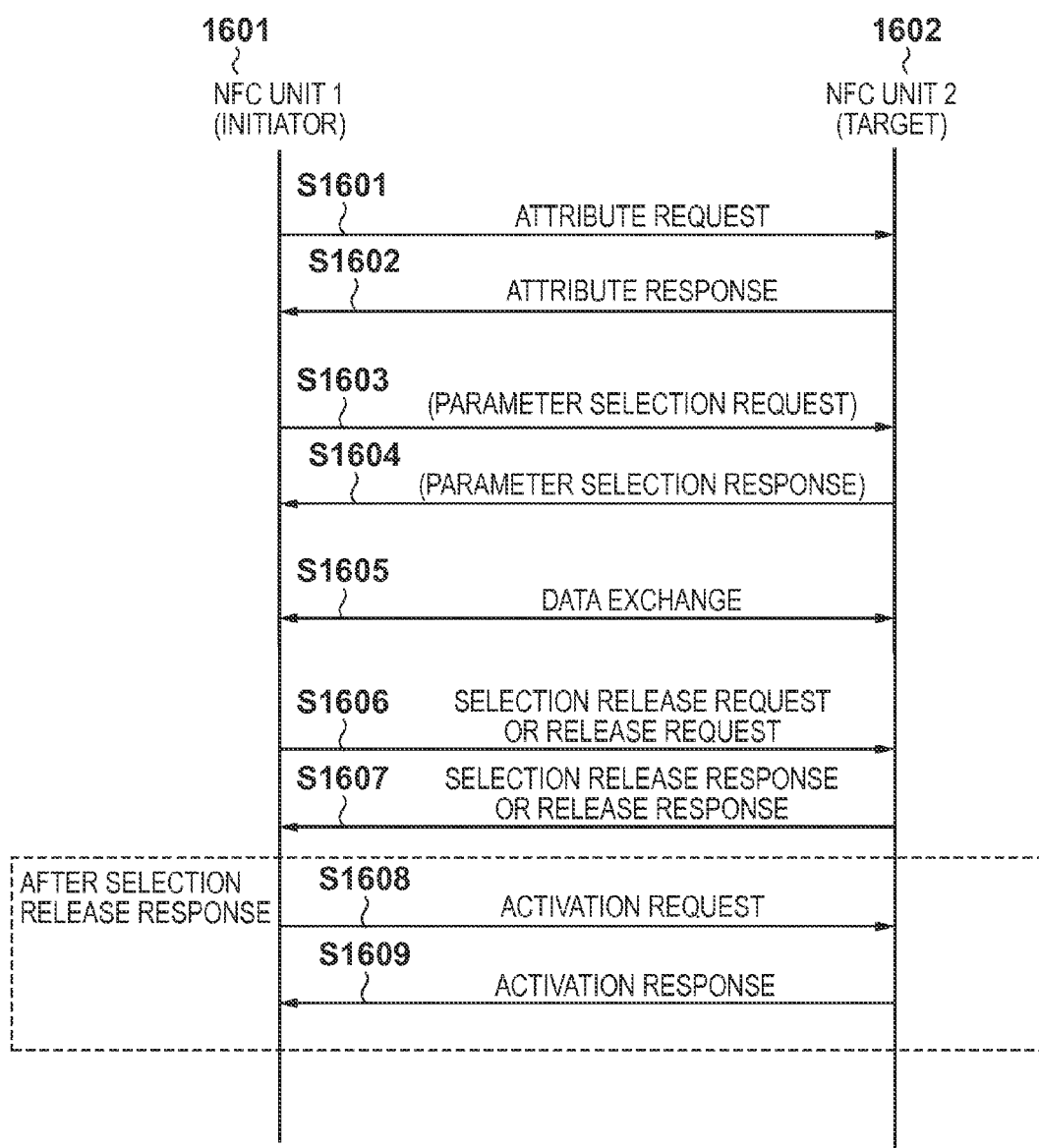
FIG. 16 is a chart showing the data exchange sequence in the active mode.

FIG. 16 is a sequence chart of data exchange in the active mode.

In FIG. 16, a case will be described below wherein a first NFC unit 1601 operates as an initiator, and a second NFC unit 1602 operates as a target.

In step S1601, the first NFC unit 1601 transmits a self identifier, a bit transmission rate of transmission/reception, a valid data length, and the like as an attribute request.

Upon reception of a valid attribute request, the second NFC unit 1602 transmits an attribute response in step S1602. In this case, transmission from the second NFC unit 1602 is attained by an RF field generated by itself. For this reason, the first and second NFC units 1601 and 1602 stop outputting an RF field after completion of data transmission.

After the first NFC unit 1601 confirms a valid attribute response, it transmits a parameter selection request to change parameters of a transmission protocol in step S1603. Parameters included in the parameter selection request are a transmission rate and valid data length.

Upon reception of a valid parameter selection request, the second NFC unit 1602 transmits a parameter selection response and changes the parameters in step S1604. Note that as in the passive mode, steps S1603 and S1604 may be omitted if the parameters are not changed.

In step S1605, the first and second NFC units 1601 and 1602 exchange data by a data exchange request and data exchange response. The data exchange request and response can transmit information for applications included in communication partners as data, and can divisionally transmit information when a data size is large.

Upon completion of data exchange, the first NFC unit 1601 transmits either a selection release request or release request in step S1606.

When the first NFC unit 1601 transmits the selection release request, the second NFC unit 1602 transmits a selection release response in step S1607. Upon reception of the selection release request, the first NFC unit 1601 releases the attributes indicating the second NFC unit 1602. After that, in step S1608, the first NFC unit 1601 transmits an activation request to another target, an identifier of which is given. A target, which received the activation request, transmits an activation response in step S1609, and the process returns to step S1601.

On the other hand, when the first NFC unit 1601 transmits the release request, the second NFC unit 1602 transmits a release response in step S1607. Upon reception of the release response, the first NFC unit 1601 transmits a release response in step S1608, and returns to an initial state. When the first NFC unit 1601 receives the release response, it may return to an initial state since the target is completely released.

FIG. 17 shows a packet example of a data exchange request.

A DEP_REQ command can be returned as a response including arbitrary user data. Command bytes CMD 0 and CMD 1 required to identify the DEP_REQ command have to be set to be "D4" and "06", respectively. Byte 0 to Byte 2 are indispensable data bytes specified by the NFC standard. Byte 3 to Byte n are user data bytes, and can be arbitrarily selected by the user. A data size is defined in advance by attribute information (ATR), but it is often changed by an FSL byte of a parameter selection command (PSL_REQ). FIG. 17 exemplifies a case in which a command which requests to change apparatus settings is transmitted. "DEV_SET_CHG_REQ" is a command which requests a target to change apparatus settings. A data size is arbitrary, and is defined by functions included in the target.

FIGS. 18A to 18I show display examples of a UI of a printer application and setting UIs of respective applications of the portable communication terminal apparatus 200.

Figure 18B:
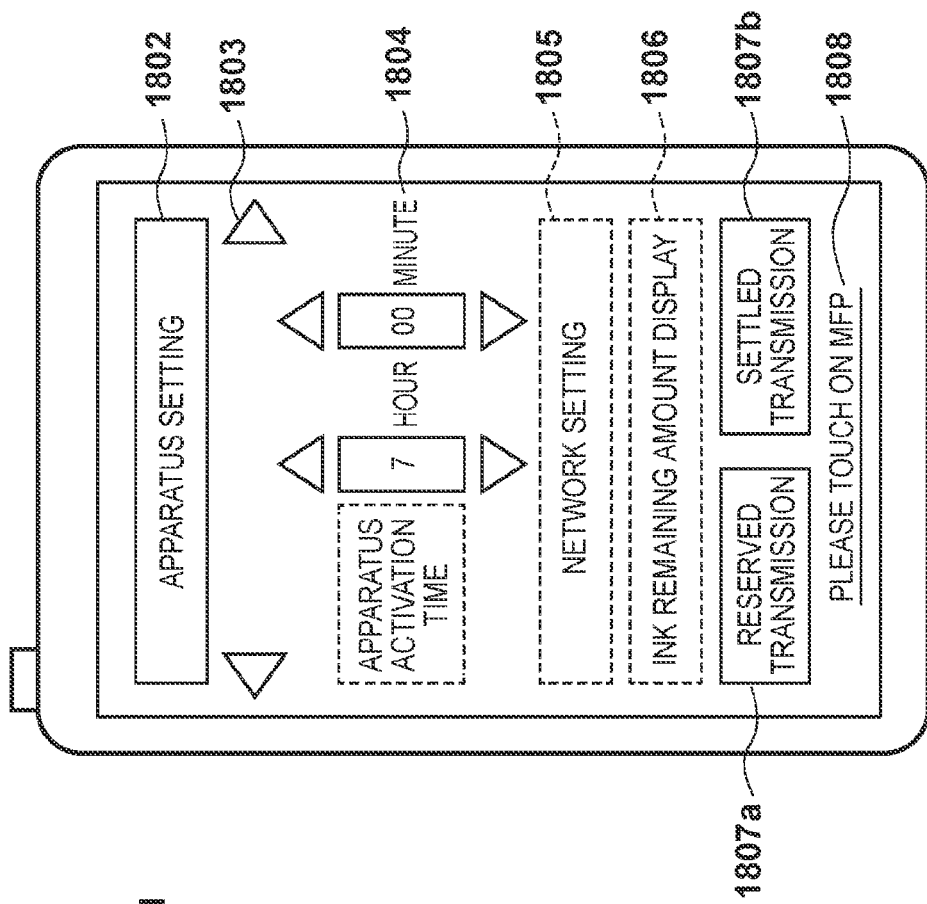
FIG. 18B is a view showing an example of a UI of the printer application.
Figure 18A:
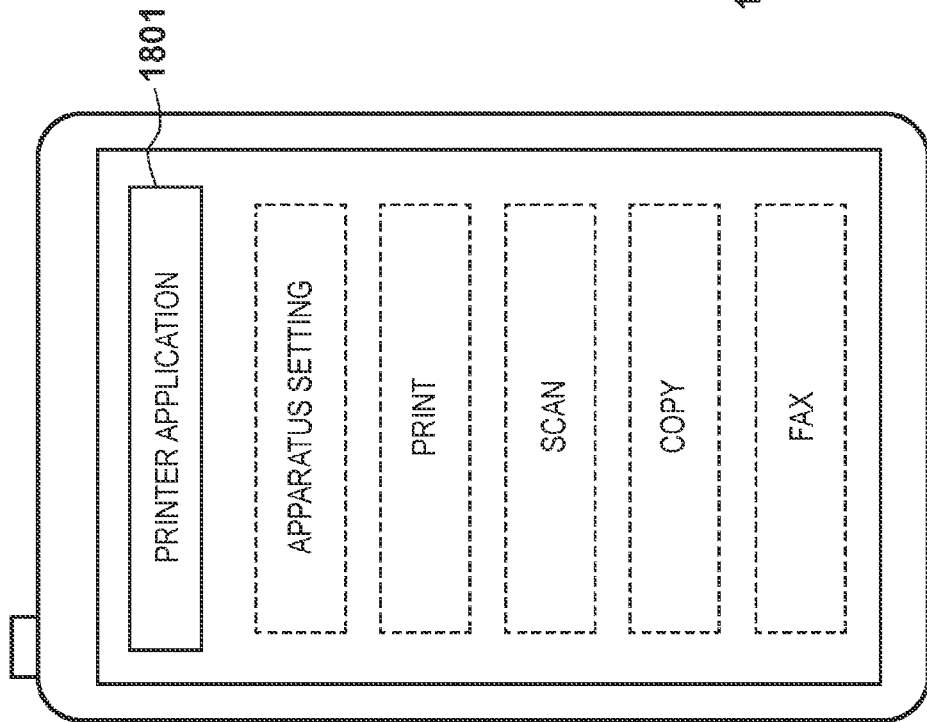
FIG. 18A is a view showing an example of a UI of a printer application.

FIG. 18A shows a display example of a UI of a printer application 1801, and this UI allows the user to make apparatus settings, and to issue a print, scan, copy, or FAX execution instruction with respect to the MFP 300. Execution instruction items are not limited to those enumerated in FIG. 18A, and an item of, for example, apparatus maintenance may be added.

FIG. 18B shows a display example of an apparatus setting UI, which displays a list of apparatus setting items with respect to the MFP 300. In FIG. 18B, reference numeral 1803 denotes a cursor item to the next page, which item is required to refer to the next settable item; 1804, a change control of an activation time of the MFP 300; 1805, a change item of network settings; and 1806, an item used to display an ink remaining amount.

After completion of settings, when the user presses a reserved transmission button 1807*a*, only a setting change reservation is made for the MFP 300, and is registered only on the NFC memory of the NFC unit 718 (FIG. 7) depending on an activation state (soft power-OFF state or the like) of the apparatus, thus closing the UI. When the user presses a settled transmission button 1807*b*, setting changes in the apparatus are made irrespective of the state of the MFP 300. When the user presses either of these buttons, an operation as an initiator is started based on an instruction from the application, and a message 1808 which notifies the user that the apparatus is ready to communicate with the MFP 300 is displayed on an apparatus setting application screen. Apparatus setting items are not limited to those, and an item which allows to set a registration adjustment value may be included.

FIG. 18C shows a display example of a UI required to issue a print instruction. Reference numeral 1810 denotes a setting item of a paper type such as plain paper; 1811, a setting item of a paper width such as A4; 1812, a setting item of a print mode such as "fine"; and 1813, a setting item of image data to be printed.

After completion of settings, when the user presses a reserved transmission button 1814*a*, only a print reservation is made for the MFP 300, and is registered only on the NFC memory of the NFC unit 718 depending on an activation state (soft power-OFF state or the like) of the apparatus, thus closing the UI. When the user presses a settled transmission button 1814*b*, a print operation is executed irrespective of the state of the MFP 300. When the user presses either of these buttons, an operation as an initiator is started based on an instruction from the application, and a message 1815 which notifies the user that the apparatus is ready to communicate with the MFP 300 is displayed on a print instruction application screen. Print setting items are not limited to those, and can be decided arbitrarily.

FIG. 18D shows a display example of a UI required to issue a scan instruction. Reference numeral 1816 denotes a setting item of a scan resolution; 1817, a setting item of a scan range such as A4; and 1818, a designation item of a saving destination of a scan image.

After completion of settings, when the user presses a reserved transmission button 1819*a*, only a scan reservation is made for the MFP 300, and is registered only on the NFC memory of the NFC unit 718 depending on an activation state (soft power-OFF state or the like) of the apparatus, thus closing the UI. When the user presses a settled transmission button 1819*b*, a scan operation is executed irrespective of the state of the MFP 300. When the user presses either of these buttons, an operation as an initiator is started based on an instruction from the application, and a message 1820 which notifies the user that the apparatus is ready to communicate with the MFP 300 is displayed on a scan instruction application screen. Scan setting items are not limited to those, and can be decided arbitrarily.

FIG. 18E shows a display example of a UI required to issue a copy instruction. Reference numeral 1821 denotes a setting item of a copy paper type such as plain paper; 1822, a setting item of a copy paper width such as A4; and 1823, a designation item of a copy mode such as "fine".

After completion of settings, when the user presses a reserved transmission button 1824*a*, only a copy reservation is made for the MFP 300, and is registered only on the NFC memory of the NFC unit 718 depending on an activation state (soft power-OFF state or the like) of the apparatus, thus closing the UI. When the user presses a settled transmission button 1824*b*, a copy operation is executed irrespective of the state of the MFP 300. When the user presses either of these buttons, an operation as an initiator is started based on an instruction from the application, and a message 1825 which notifies the user that the apparatus is ready to communicate with the MFP 300 is displayed on a copy setting application screen. Copy setting items are not limited to those, and can be decided arbitrarily.

FIG. 18F shows a display example of a UI required to issue a FAX instruction. Reference numeral 1826 denotes a setting item of FAX transmission; and 1827, a setting item of FAX reception. On this screen, transmission buttons 1828 are disabled.

When the user presses the FAX transmission setting item 1826, the current screen transits to a FAX transmission setting screen shown in FIG. 18G, thus allowing the user to make FAX transmission settings. Reference numeral 1830 denotes a setting item of a paper type such as plain paper; 1831, a setting item of a paper size such as A4; 1832, a setting item of a transmission mode such as "fine"; and 1833, a designation item of transmission data when IFAX is used. After completion of settings, when the user presses a reserved transmission button 1834*a*, only a FAX transmission reservation is made for the MFP 300, and is registered only on the NFC memory of the NFC unit 718 depending on an activation state (soft power-OFF state or the like) of the apparatus, thus closing the UI. When the user presses a settled transmission button 1834*b*, FAX transmission is executed irrespective of the state of the MFP 300. When the user presses either of these buttons, an operation as an initiator is started based on an instruction from the application, and a message 1835 which notifies the user that the apparatus is ready to communicate with the MFP 300 is displayed on a FAX transmission application screen. FAX transmission setting items are not limited to those, and can be decided arbitrarily.

When the user presses the FAX reception setting item 1827, the current screen transits to a FAX reception setting screen shown in FIG. 18H, thus allowing the user to make FAX reception settings. Reference numeral 1836 denotes a reception mode setting item. After completion of settings, when the user presses a reserved transmission button 1837*a*, only a FAX reception reservation is made for the MFP 300, and is registered only on the NFC memory of the NFC unit 718 depending on an activation state (soft power-OFF state or the like) of the apparatus, thus closing the UI. When the user presses a settled transmission button 1837*b*, FAX reception is executed irrespective of the state of the MFP 300. When the user presses either of these buttons, an operation as an initiator is started based on an instruction from the application, and a message 1838 which notifies the user that the apparatus is ready to communicate with the MFP 300 is displayed on a FAX reception application screen. FAX reception setting items are not limited to those, and can be decided arbitrarily.

Figure 19A:
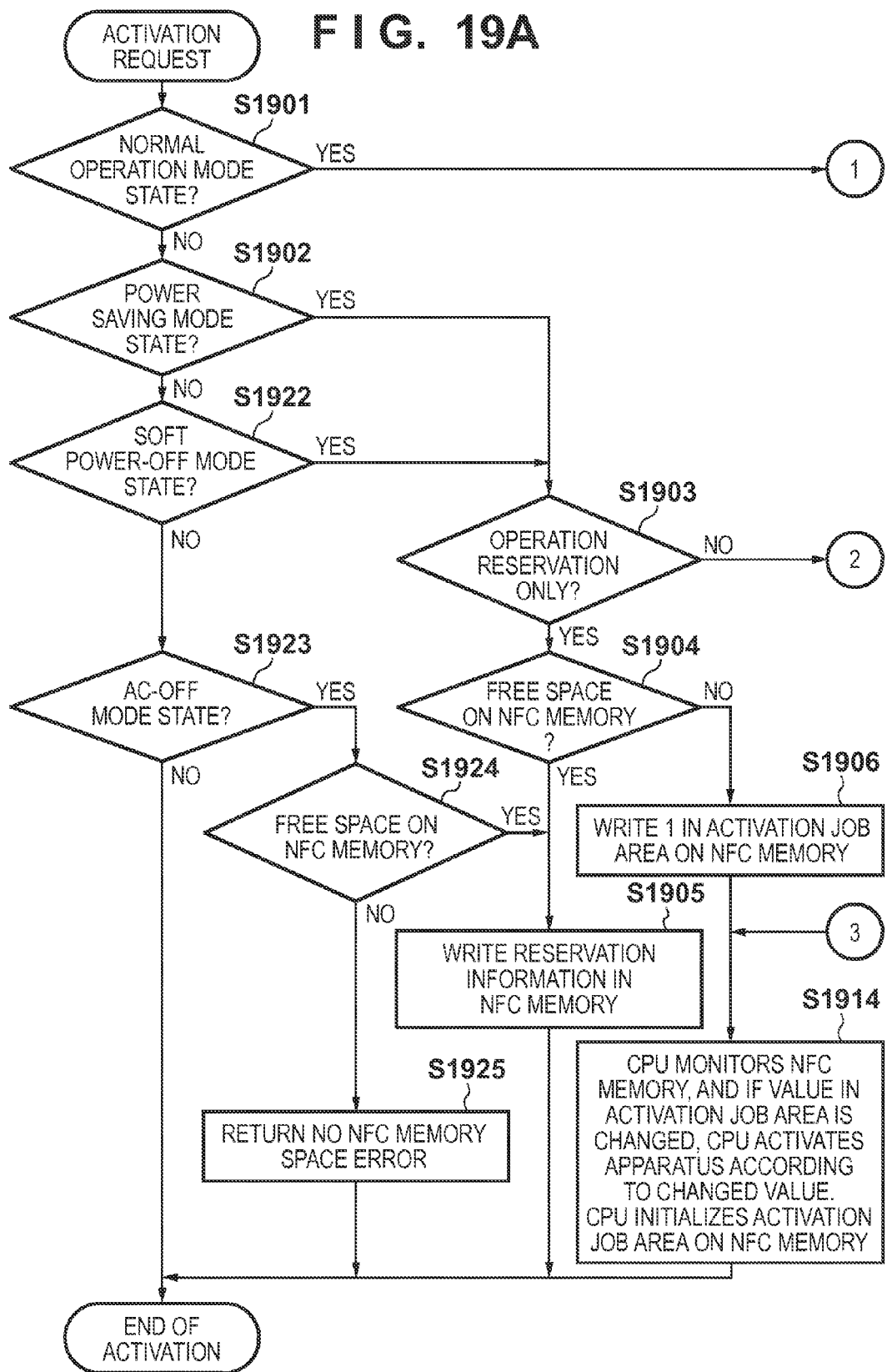
FIG. 19A is a flowchart executed when an activation request is received from the portable communication terminal apparatus.
Figure 19B:
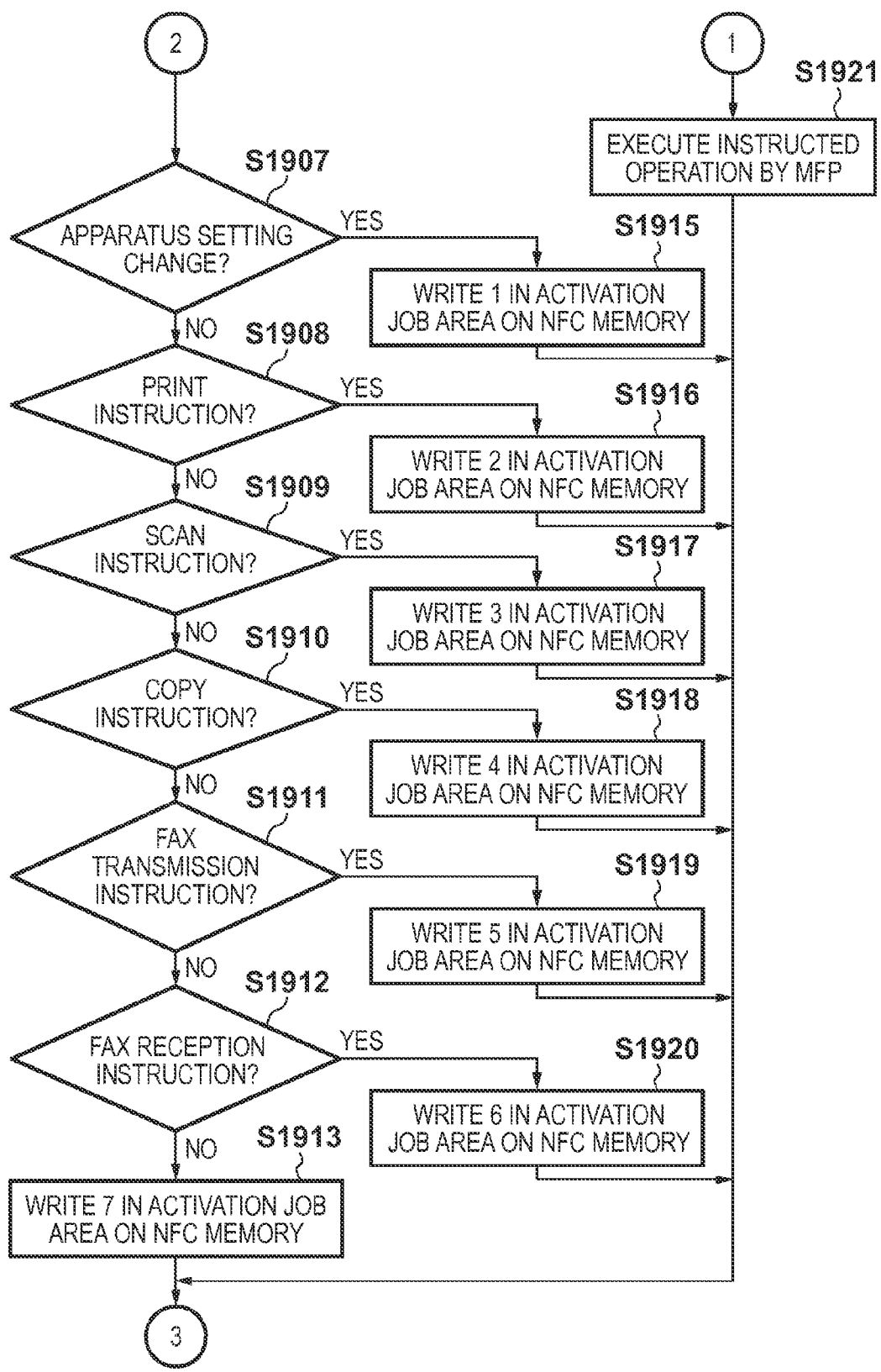
FIG. 19B is a flowchart executed when an activation request is received from the portable communication terminal apparatus.

FIGS. 19A and 19B are flowcharts executed when the MFP 300 changes an activation method of each control unit of itself according to the self state in response to an operation request from the portable communication terminal apparatus 200. In this processing, the MFP 300 receives an operation request from the portable communication terminal apparatus 200 (first reception), and the portable communication terminal apparatus 200 receives a response to the operation request from the MFP 300 (second reception).

The MFP 300 determines in step S1901 with reference to the contents (the next estimated activation time 1305 (FIG. 13)) in the NFC memory of the NFC memory 818 (FIG. 8) whether or not it is in a normal operation mode state in which predetermined electric power is supplied. If the MFP 300 is in the normal operation mode state (YES in step S1901), it directly transfers an operation request from the portable communication terminal apparatus 200 to the CPU 802, thus executing a requested operation.

On the other hand, if the MFP 300 is not in the normal operation mode state (NO in step S1901), the MFP 300 determines in step S1902 whether or not it is in a power saving mode state in which electric power to be supplied is lower than that in the normal operation mode state. Furthermore, the MFP 300 determines in step S1922 whether or not it is in a soft power-OFF mode state in which electric power to be supplied is lower than that in the power saving mode.

If the MFP 300 is in the power saving mode state (YES in step S1902) or it is in the soft power-OFF mode state (YES in step S1922), the process advances to step S1903, and the MFP 300 determines whether or not an operation request from the portable communication terminal apparatus 200 is only an operation reservation. If the operation request is only an operation reservation (YES in step S1903), the MFP 300 determines in step S1904 whether or not the NFC memory of the NFC unit 818 has a free space. If the NFC memory has a free space (YES in step S1904), the MFP 300 writes reservation information in a corresponding reservation area on the NFC memory of the NFC unit 818, thus ending the processing in step S1905.

Note that whether or not the NFC memory has a free space is determined by checking, for example, whether or not a free area of the NFC memory is equal to or smaller than a predetermined amount.

On the other hand, if the NFC memory does not have a free space (NO in step S1904), the MFP 300 writes activation information 1 in the activation job area 1312 on the NFC memory of the NFC unit 818 in step S1906, thus ending the processing.

In this case, the activation information indicates units (that is, units in the image processing apparatus), a power supply of which is to be activated, of the MFP 300.

If "1" is set in the activation job area 1312, electric power is supplied to activate only units required to save information (for example, the nonvolatile memory 805 which can save reservation information).

If "2" is set in the activation job area 1312, electric power is supplied to activate only units required for a print operation (for example, the printing unit 815 and printing control unit 816 which are required for the print operation).

If "3" is set in the activation job area 1312, electric power is supplied to activate only units required for a scan operation (for example, the reading unit 810 and reading control unit 808 which are required for the scan operation).

If "4" is set in the activation job area 1312, electric power is supplied to activate only units required for a copy operation (for example, the printing unit 815, printing control unit 816, reading unit 810, and reading control unit 808 which are required for the copy operation).

If "5" is set in the activation job area 1312, electric power is supplied to activate only units required for FAX transmission (for example, the reading unit 810, reading control unit 808, FAX control unit 823, modem 825, which are required for the FAX transmission).

If "6" is set in the activation job area 1312, electric power is supplied to activate only units required for FAX reception (for example, the FAX control unit 823 and modem 825 which are required for the FAX reception).

If "7" is set in the activation job area 1312, electric power is supplied all control units/processing units to activate the MFP 300.

The number of pieces of activation information is not limited to seven, and may be increased as needed.

If the MFP 300 determines in step S1903 that the operation request is not only an operation reservation (NO in step S1903), it determines a requested operation in subsequent steps S1907 to S1912. The MFP 300 determines in step S1907 whether or not the requested operation is an apparatus setting change. If the requested operation is an apparatus setting change (YES in step S1907), the MFP 300 writes activation information 1 in the activation job area 1312 on the NFC memory in step S1915.

If the requested operation is not an apparatus setting change (NO in step S1907), the MFP 300 determines in step S1908 whether or not the requested operation is a print instruction. If the requested operation is a print instruction (YES in step S1908), the MFP 300 writes activation information 2 in the activation job area 1312 on the NFC memory.

If the requested operation is not a print instruction (NO in step S1908), the MFP 300 determines in step S1909 whether or not the requested operation is a scan instruction. If the requested operation is a scan instruction (YES in step S1909), the MFP 300 writes activation information 3 in the activation job area 1312 on the NFC memory.

If the requested operation is not a scan instruction (NO in step S1909), the MFP 300 determines in step S1910 whether or not the requested operation is a copy instruction. If the requested operation is a copy instruction (YES in step S1910), the MFP 300 writes activation information 4 in the activation job area 1312 on the NFC memory.

If the requested operation is not a copy instruction (NO in step S1910), the MFP 300 determines in step S1911 whether or not the requested operation is a FAX transmission instruction. If the requested operation is a FAX transmission instruction (YES in step S1911), the MFP 300 writes activation information 5 in the activation job area 1312 on the NFC memory.

If the requested operation is not a FAX transmission instruction (NO in step S1911), the MFP 300 determines in step S1912 whether or not the requested operation is a FAX reception instruction. If the requested operation is a FAX reception instruction (YES in step S1912), the MFP 300 writes activation information 6 in the activation job area 1312 on the NFC memory.

If the requested operation is not a FAX reception instruction (NO in step S1912), the MFP 300 writes activation information 7 in the activation job area 1312 on the NFC memory in step S1913.

In step S1914, the CPU 802 of the MFP 300 monitors the activation job area 1312 on the NFC memory of the NFC unit 818. If the value in the activation job area 1312 is changed to a value other than 0, the CPU 802 supplies electric power to the apparatus based on the value of the activation information, thus attaining activation. After that, the CPU 802 initializes the activation information in the activation job area 1312 on the NFC memory of the NFC unit 818 to 0.

On the other hand, if the MFP 300 determines in step S1922 that it is not in the soft power-OFF mode state (NO in step S1922), the MFP 300 determines in step S1923 whether or not it is in an AC-OFF mode state. If the MFP 300 is in the AC-OFF mode state (YES in step S1923), the MFP 300 determines in step S1924 whether or not the NFC memory of the NFC unit 818 has a free space. If the NFC memory has a free space (YES in step S1924), the MFP 300 writes reservation information in a corresponding reservation area on the NFC memory of the NFC unit 818 in step S1905, thus ending the processing. On the other hand, if the NFC memory does not have a free space (NO in step S1924), the MFP 300 notifies the portable communication terminal apparatus 200 of error information indicating that the NFC memory of the NFC unit 818 does not have a free space in step S1925. In response to this information, the portable communication terminal apparatus 200 displays an error screen 1839 (FIG. 18I).

Figure 20:
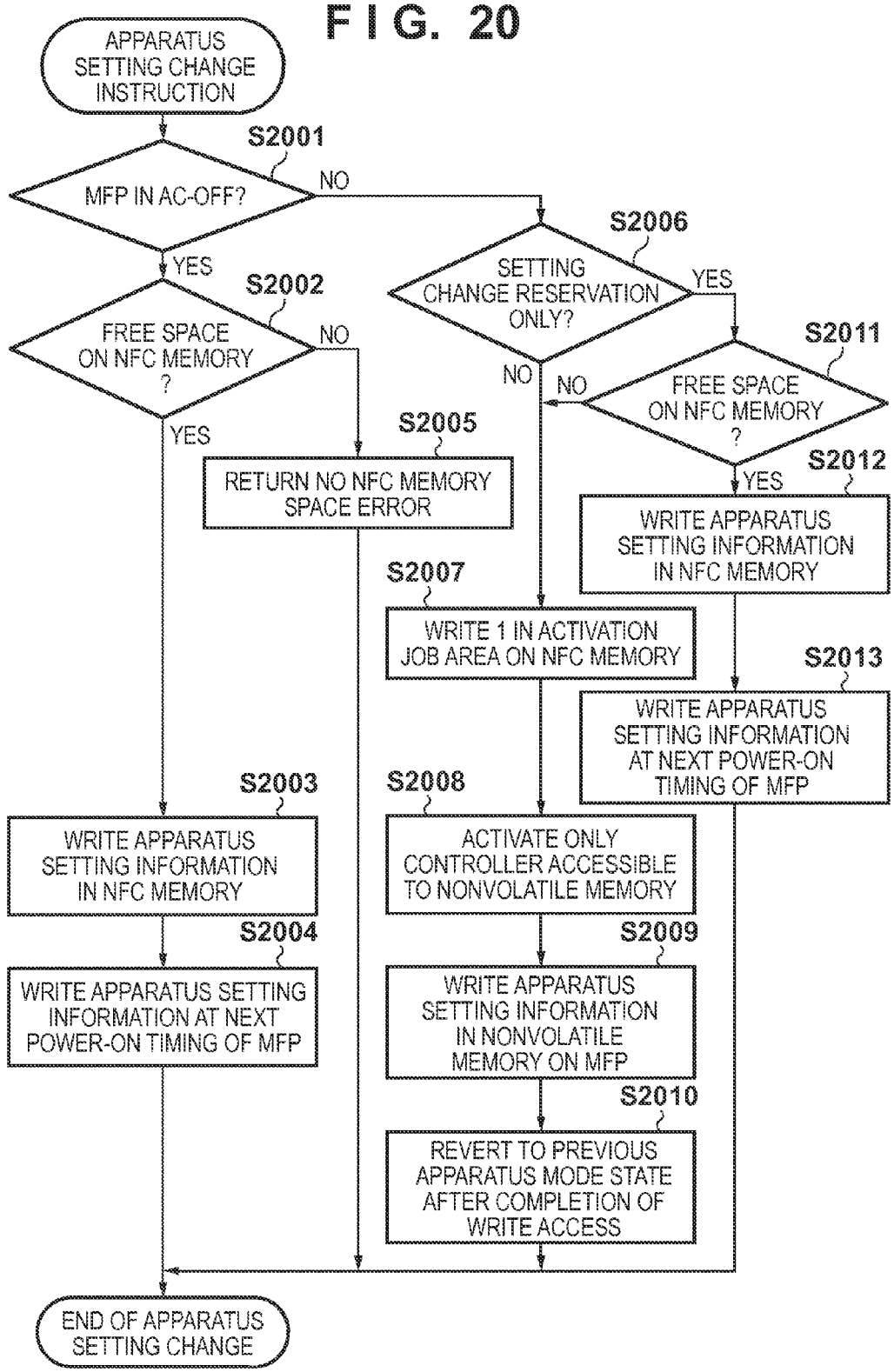
FIG. 20 is a flowchart of an apparatus setting change when a normal operation mode state is not set.

FIG. 20 is a flowchart showing the detailed sequence when the MFP 300 receives an apparatus setting change request from the portable communication terminal apparatus 200 when it is not in the normal operation mode state, that is, it is in the power saving mode state, soft power-OFF mode state, or AC-OFF mode state. That is, FIG. 20 shows processing in a case other than the normal operation mode.

The MFP 300 determines in step S2001 whether or not it is in the AC-OFF mode state. If the MFP 300 is in the AC-OFF mode state (YES in step S2001), it determines in step S2002 whether or not the NFC memory of the NFC unit 818 has a free space. If the NFC memory has a free space (YES in step S2002), the MFP 300 writes apparatus setting information in the setting change job 1311 on the NFC memory of the NFC unit 818 in step S2003. In step S2004, the MFP 300 writes that apparatus setting information in its setting information 1206 at the next power-ON timing.

On the other hand, if the NFC memory does not have a free space (NO in step S2002), the MFP 300 notifies the portable communication terminal apparatus 200 of error information indicating that the NFC memory of the NFC unit 818 does not have a free space in step S2005. In response to this information, the portable communication terminal apparatus 200 displays the error screen 1839.

If the MFP 300 is not in the AC-OFF mode state (NO in step S2001), the MFP 300 determines in step S2006 whether or not the apparatus setting change request is only an apparatus setting change reservation. If the apparatus setting change request is not only an apparatus setting change reservation (NO in step S2006), the MFP 300 writes activation information 1 in the activation job area 1312 on the NFC memory of the NFC unit 818 in step S2007. In step S2008, the MFP 300 executes power activation of units which are designated by activation information 1 and can access the nonvolatile memory. In step S2009, the MFP 300 writes apparatus setting information in the setting information 1206 on itself. After that, in step S2010, after completion of the write access, the MFP 300 reverts to the previous apparatus mode state, for example, the power saving mode state.

If the apparatus setting change request is only an apparatus setting change reservation (YES in step S2006), the MFP 300 determines in step S2011 whether or not the NFC memory of the NFC unit 818 has a free space. If the NFC memory has a free space (YES in step S2011), the MFP 300 writes apparatus setting information in the setting change job 1311 on the NFC memory of the NFC unit 818 in step S2012. In step S2013, the MFP 300 writes that apparatus setting information in its setting information 1206 at the next power-ON timing. On the other hand, if the NFC memory does not have a free space (NO in step S2011), the process advances to step S2007.

Figure 21A:
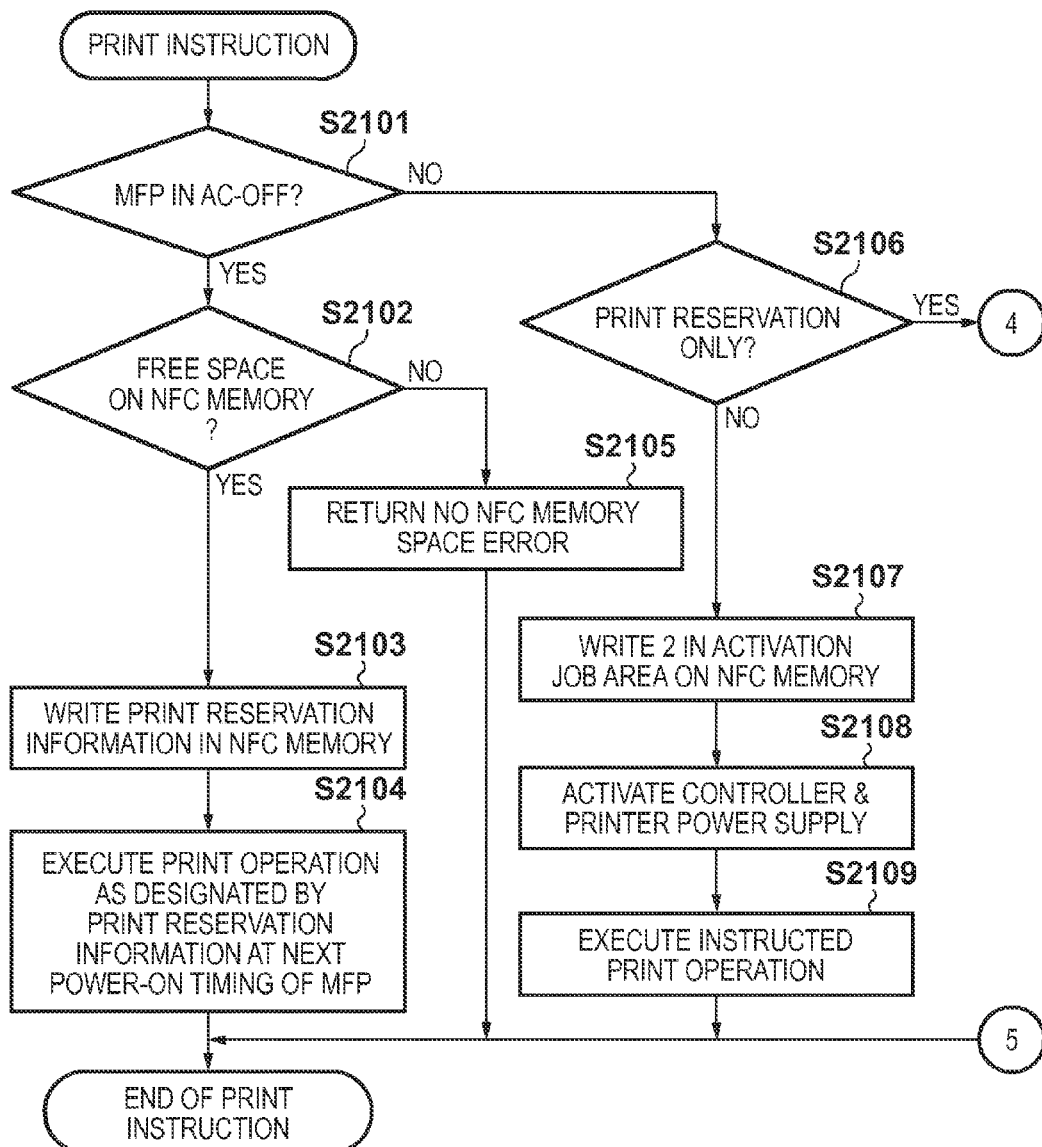
FIG. 21A is a flowchart of a print instruction when a normal operation mode state is not set.
Figure 21B:
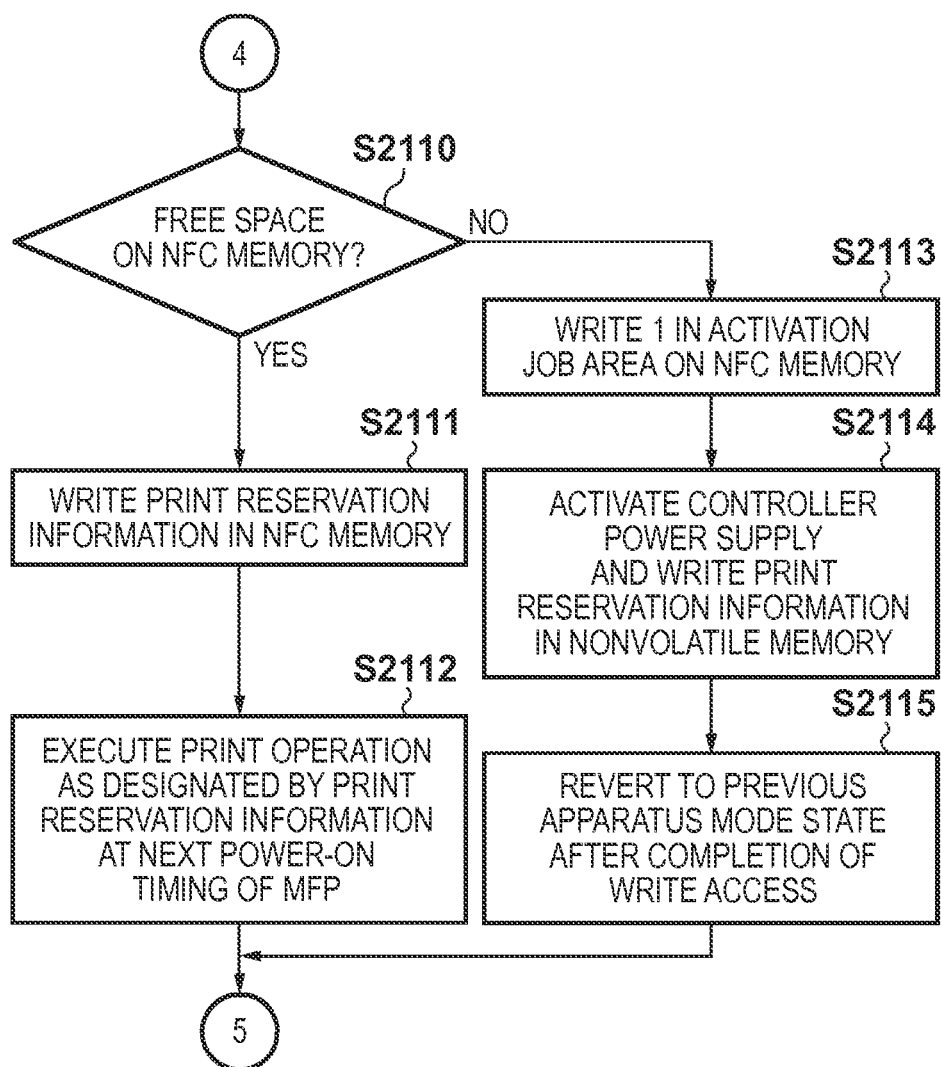
FIG. 21B is a flowchart of a print instruction when a normal operation mode state is not set.

FIGS. 21A and 21B are flowcharts showing the detailed sequence when the MFP 300 receives a print instruction request from the portable communication terminal apparatus 200 when it is not in the normal operation mode state, that is, it is in the power saving mode state, soft power-OFF mode state, or AC-OFF mode state.

The MFP 300 determines in step S2101 whether or not it is in the AC-OFF mode state. If the MFP 300 is in the AC-OFF mode state (YES in step S2101), it determines in step S2102 whether or not the NFC memory of the NFC unit 818 has a free space. If the NFC memory has a free space (YES in step S2102), the MFP 300 writes print reservation information in the print job 1307 on the NFC memory of the NFC unit 818 in step S2103. In step S2104, the MFP 300 executes a print operation as designated by the print reservation information at the next power-ON timing.

On the other hand, if the NFC memory does not have a free space (NO in step S2102), the MFP 300 notifies the portable communication terminal apparatus 200 of error information indicating that the NFC memory of the NFC unit 818 does not have a free space in step S2105. In response to this information, the portable communication terminal apparatus 200 displays the error screen 1839.

If the MFP 300 is not in the AC-OFF mode state (NO in step S2101), the MFP 300 determines in step S2106 whether or not the print instruction request is only print reservation. If the print instruction request is not only a print reservation (NO in step S2106), the MFP 300 writes activation information 2 in the activation job area 1312 on the NFC memory of the NFC unit 818 in step S2107. In step S2108, the MFP 300 executes power activation by supplying electric power to units which are designated by activation information 2 and can execute the print operation. In step S2109, the MFP 300 executes the instructed print operation.

If the print instruction request is only a print reservation (YES in step S2106), the MFP 300 determines in step S2110 whether or not the NFC memory of the NFC unit 818 has a free space. If the NFC memory has a free space (YES in step S2110), the MFP 300 writes print reservation information in the print job 1307 on the NFC memory of the NFC unit 818 in step S2111. In step S2112, the MFP 300 executes a print operation as designated by the print reservation information at the next power-ON timing.

If the NFC memory does not have a free space (NO in step S2110), the MFP 300 writes activation information 1 in the activation job area 1312 on the NFC memory of the NFC unit 818 in step S2113. In step S2114, the MFP 300 executes power activation by supplying electric power to units which are designated by activation information 1 and can access the nonvolatile memory, and writes print reservation information in the job reservation storage area 1207 on itself. After that in step S2115, after completion of the write access, the MFP 300 reverts to the previous apparatus mode state, for example, the power saving mode state.

Figure 22A:
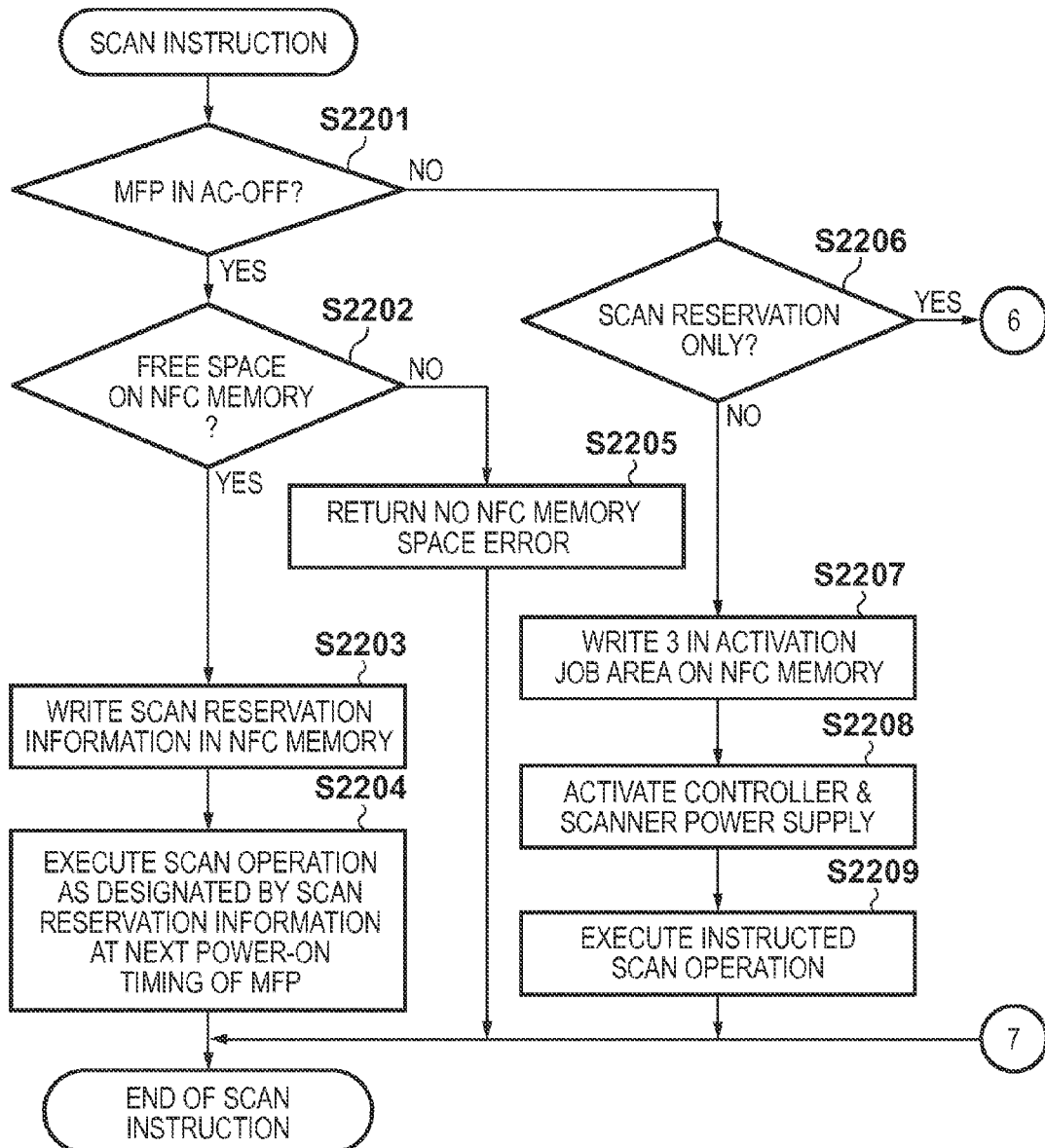
FIG. 22A is a flowchart of a scan instruction when a normal operation mode state is not set.

FIGS. 22A and 22B are flowcharts showing the detailed sequence when the MFP 300 receives a scan instruction request from the portable communication terminal apparatus 200 when it is not in the normal operation mode state, that is, it is in the power saving mode state, soft power-OFF mode state, or AC-OFF mode state.

The MFP 300 determines in step S2201 whether or not it is in the AC-OFF mode state. If the MFP 300 is in the AC-OFF mode state (YES in step S2201), it determines in step S2202 whether or not the NFC memory of the NFC unit 818 has a free space. If the NFC memory has a free space (YES in step S2202), the MFP 300 writes scan reservation information in the scan job 1308 on the NFC memory of the NFC unit 818 in step S2203. In step S2204, the MFP 300 executes a scan operation as designated by the scan reservation information at the next power-ON timing.

On the other hand, if the NFC memory does not have a free space (NO in step S2202), the MFP 300 notifies the portable communication terminal apparatus 200 of error information indicating that the NFC memory of the NFC unit 818 does not have a free space in step S2205. In response to this information, the portable communication terminal apparatus 200 displays the error screen 1839.

If the MFP 300 is not in the AC-OFF mode state (NO in step S2201), the MFP 300 determines in step S2206 whether or not the scan instruction request is only scan reservation. If the scan instruction request is not only a scan reservation (NO in step S2206), the MFP 300 writes activation information 3 in the activation job area 1312 on the NFC memory of the NFC unit 818 in step S2207. In step S2208, the MFP 300 executes power activation by supplying electric power to units which are designated by activation information 3 and can execute the scan operation. In step S2209, the MFP 300 executes the instructed scan operation.

If the scan instruction request is only a scan reservation (YES in step S2206), the MFP 300 determines in step S2210 whether or not the NFC memory of the NFC unit 818 has a free space. If the NFC memory has a free space (YES in step S2210), the MFP 300 writes scan reservation information in the scan job 1308 on the NFC memory of the NFC unit 818 in step S2211. In step S2212, the MFP 300 executes a scan operation as designated by the scan reservation information at the next power-ON timing.

If the NFC memory does not have a free space (NO in step S2210), the MFP 300 writes activation information 1 in the activation job area 1312 on the NFC memory of the NFC unit 818 in step S2213. In step S2214, the MFP 300 executes power activation by supplying electric power to units which are designated by activation information 1 and can access the nonvolatile memory, and writes scan reservation information in the job reservation storage area 1207 on itself. After that in step S2215, after completion of the write access, the MFP 300 reverts to the previous apparatus mode state, for example, the power saving mode state.

Figure 23A:
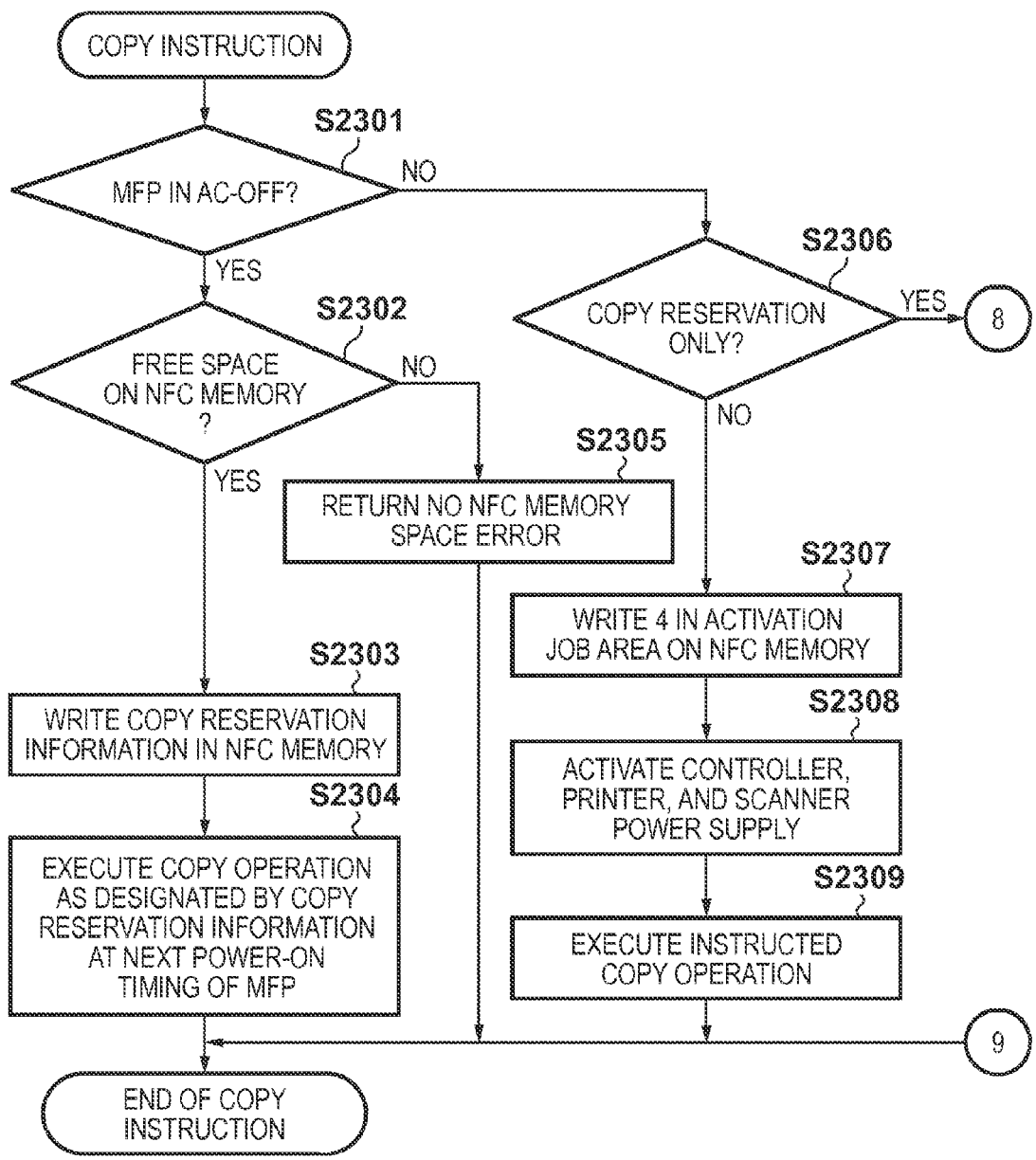
FIG. 23A is a flowchart of a copy instruction when a normal operation mode state is not set.

FIGS. 23A and 23B are flowcharts showing the detailed sequence when the MFP 300 receives a copy instruction request from the portable communication terminal apparatus 200 when it is not in the normal operation mode state, that is, it is in the power saving mode state, soft power-OFF mode state, or AC-OFF mode state.

The MFP 300 determines in step S2301 whether or not it is in the AC-OFF mode state. If the MFP 300 is in the AC-OFF mode state (YES in step S2301), it determines in step S2302 whether or not the NFC memory of the NFC unit 818 has a free space. If the NFC memory has a free space (YES in step S2302), the MFP 300 writes copy reservation information in the copy job 1309 on the NFC memory of the NFC unit 818 in step S2303. In step S2304, the MFP 300 executes a copy operation as designated by the copy reservation information at the next power-ON timing.

On the other hand, if the NFC memory does not have a free space (NO in step S2302), the MFP 300 notifies the portable communication terminal apparatus 200 of error information indicating that the NFC memory of the NFC unit 818 does not have a free space in step S2305. In response to this information, the portable communication terminal apparatus 200 displays the error screen 1839.

If the MFP 300 is not in the AC-OFF mode state (NO in step S2301), the MFP 300 determines in step S2306 whether or not the copy instruction request is only copy reservation. If the copy instruction request is not only a copy reservation (NO in step S2306), the MFP 300 writes activation information 4 in the activation job area 1312 on the NFC memory of the NFC unit 818 in step S2307. In step S2308, the MFP 300 executes power activation by supplying electric power to units which are designated by activation information 4 and can execute the copy operation. In step S2309, the MFP 300 executes the instructed copy operation.

If the copy instruction request is only a copy reservation (YES in step S2306), the MFP 300 determines in step S2310 whether or not the NFC memory of the NFC unit 818 has a free space. If the NFC memory has a free space (YES in step S2310), the MFP 300 writes copy reservation information in the copy job 1309 on the NFC memory of the NFC unit 818 in step S2311. In step S2312, the MFP 300 executes a copy operation as designated by the copy reservation information at the next power-ON timing.

If the NFC memory does not have a free space (NO in step S2310), the MFP 300 writes activation information 1 in the activation job area 1312 on the NFC memory of the NFC unit 818 in step S2313. In step S2314, the MFP 300 executes power activation by supplying electric power to units which are designated by activation information 1 and can access the nonvolatile memory, and writes copy reservation information in the job reservation storage area 1207 on itself. After that in step S2315, after completion of the write access, the MFP 300 reverts to the previous apparatus mode state, for example, the power saving mode state.

Figure 24A:
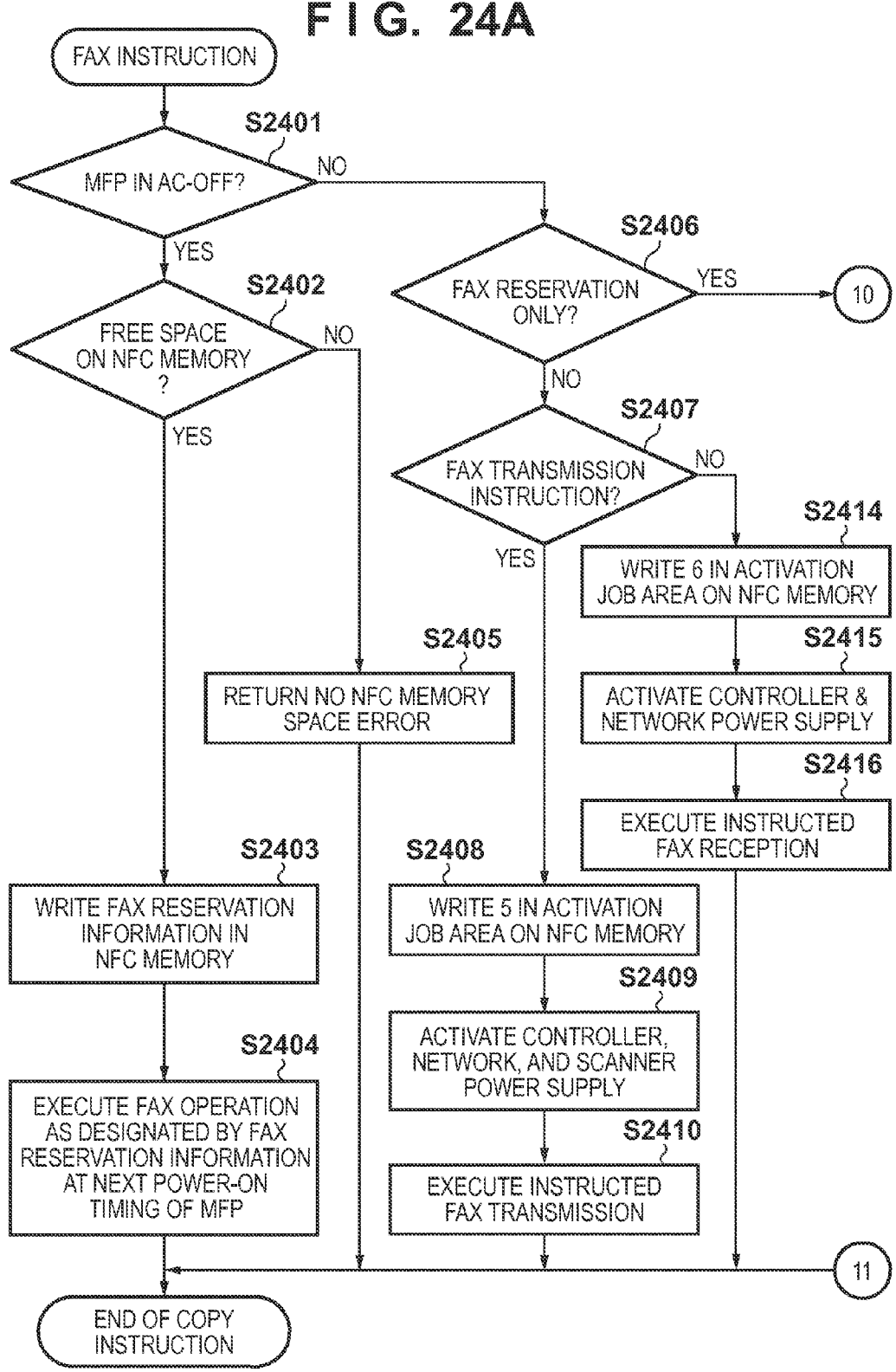
FIG. 24A is a flowchart of a FAX instruction when a normal operation mode state is not set.
Figure 24B:
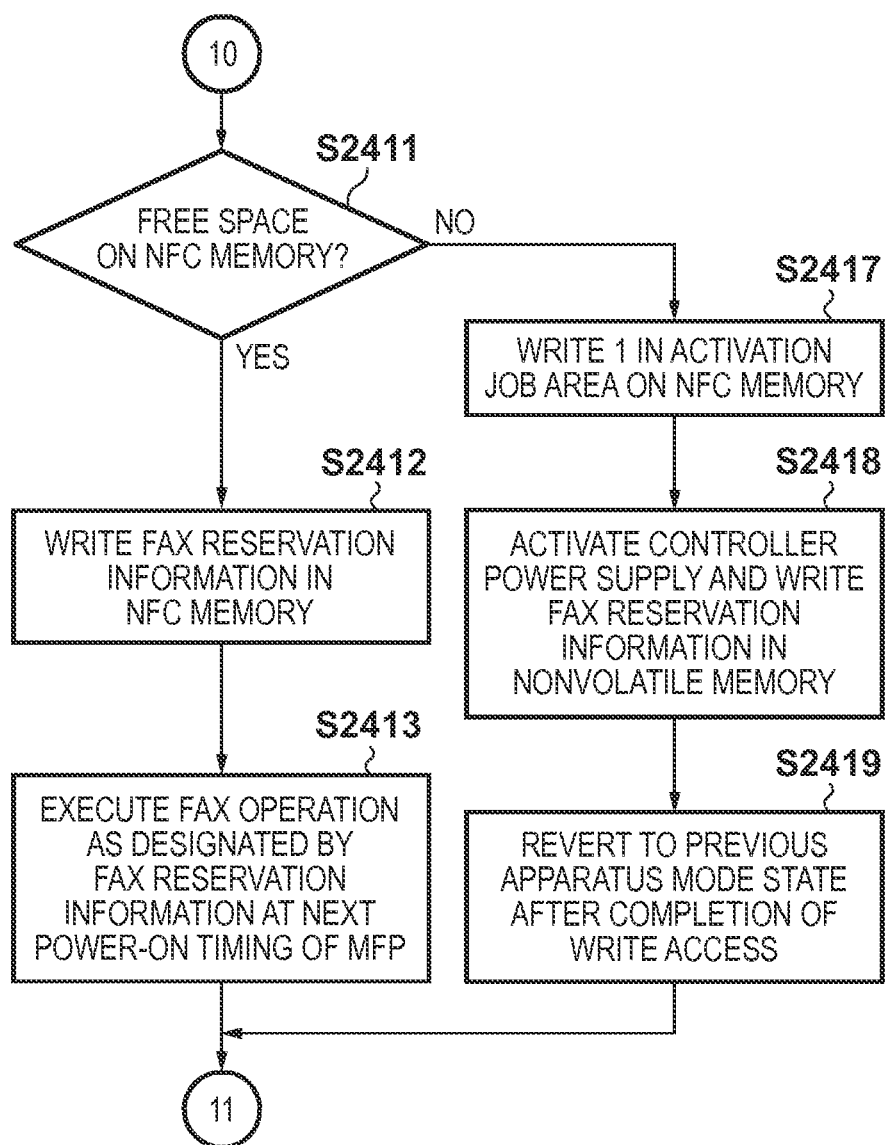
FIG. 24B is a flowchart of a FAX instruction when a normal operation mode state is not set.

FIGS. 24A and 24B are flowcharts showing the detailed sequence when the MFP 300 receives a FAX instruction request from the portable communication terminal apparatus 200 when it is not in the normal operation mode state, that is, it is in the power saving mode state, soft power-OFF mode state, or AC-OFF mode state.

The MFP 300 determines in step S2401 whether or not it is in the AC-OFF mode state. If the MFP 300 is in the AC-OFF mode state (YES in step S2401), it determines in step S2402 whether or not the NFC memory of the NFC unit 818 has a free space. If the NFC memory has a free space (YES in step S2402), the MFP 300 writes FAX reservation information in the FAX job 1310 on the NFC memory of the NFC unit 818 in step S2403. In step S2404, the MFP 300 executes a FAX operation as designated by the FAX reservation information at the next power-ON timing.

On the other hand, if the NFC memory does not have a free space (NO in step S2402), the MFP 300 notifies the portable communication terminal apparatus 200 of error information indicating that the NFC memory of the NFC unit 818 does not have a free space in step S2405. In response to this information, the portable communication terminal apparatus 200 displays the error screen 1839.

If the MFP 300 is not in the AC-OFF mode state (NO in step S2401), the MFP 300 determines in step S2406 whether or not the FAX instruction request is only FAX reservation. If the FAX instruction request is not only a FAX reservation (NO in step S2406), the MFP 300 determines in step S2407 whether or not the FAX instruction request is a FAX transmission instruction. If the FAX instruction request is a FAX transmission request (YES in step S2407), the MFP 300 writes activation information 5 in the activation job area 1312 on the NFC memory of the NFC unit 818 in step S2408. In step S2409, the MFP 300 executes power activation by supplying electric power to units which are designated by activation information 5 and can execute the FAX transmission operation. In step S2410, the MFP 300 executes the instructed FAX transmission operation.

If the FAX instruction request is a FAX reception instruction (NO in step S2407), the MFP 300 writes activation information 6 in the activation job area 1312 on the NFC memory of the NFC unit 818 in step S2414. In step S2415, the MFP 300 executes power activation by supplying electric power to units which are designated by activation information 6 and can execute the FAX reception operation. In step S2416, the MFP 300 executes the instructed FAX reception operation.

If the FAX instruction request is only a FAX reservation (YES in step S2406), the MFP 300 determines in step S2411 whether or not the NFC memory of the NFC unit 818 has a free space. If the NFC memory has a free space (YES in step S2411), the MFP 300 writes FAX reservation information in the FAX job 1310 on the NFC memory of the NFC unit 818 in step S2412. In step S2413, the MFP 300 executes a FAX operation as designated by the FAX reservation information at the next power-ON timing.

If the NFC memory does not have a free space (NO in step S2411), the MFP 300 writes activation information 1 in the activation job area 1312 on the NFC memory of the NFC unit 818 in step S2417. In step S2418, the MFP 300 executes power activation by supplying electric power to units which are designated by activation information 1 and can access the nonvolatile memory, and writes FAX reservation information in the job reservation storage area 1207 on itself. After that in step S2419, after completion of the write access, the MFP 300 reverts to the previous apparatus mode state, for example, the power saving mode state.

As described above, according to this embodiment, the MFP activation method is adaptively switched according to an operation request from the portable communication terminal apparatus and an operation state of the apparatus, thus preventing power consumption of the apparatus from being wasted. More specifically, the MFP activation method is adaptively switched by writing reservation information of an operation indicated by an operation request in the NFC memory incorporated in the NFC unit.

Note that the aforementioned embodiment has exemplified the case in which the operation states of the apparatus include the normal operation mode, standby power mode, and power-OFF mode, and the activation method is switched according to each of these three states. However, the present invention is not limited to this, and the operation method may be switched according to each of two out of the aforementioned three states.

Furthermore, in the aforementioned embodiment, since electric power is supplied by electromagnetic induction, even when no AC electric power is supplied to the MFP, information of a job and operation request can be written in the NFC memory. Hence, the MFP can judge the contents of the job and operation request when it executes the job.

The aforementioned embodiment has exemplify the MFP, which executes image processing such as print processing, as the apparatus. However, the present invention is not limited to this, and is applicable to an information processing apparatus which handles various kinds of data.

The present invention is applicable to a wireless communication apparatus and wireless communication system and, more particularly, in an apparatus which can make short distance wireless communications, establishment of peer-to-peer connection between such apparatuses, and a wireless communication system of these apparatuses.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048622, filed on Mar. 5, 2012 which is hereby incorporated by reference herein in its entirety.

What is claimed is:

1. An apparatus which causes a device to print an image, the apparatus comprising:
   at least one processor; and
   a display screen,
   wherein a state of the apparatus is changed from a first state to a second state when the image is settled as a print target by a user, the first state being a state in which the at least one processor does not cause the device to print the image even if the apparatus is put close to the device and the second state being a state in which the at least one processor can cause the device to print the image if the apparatus is put close to the device,
   wherein the at least one processor causes the display screen to display first information for confirmation of the image and not to display second information for prompting the user to put the apparatus close to the device for printing the image before the image is settled as the print target by the user when the state of the apparatus is the first state,
   wherein the at least one processor causes the display screen to display the second information with the first information, after the image is settled as the print target and when the state of the apparatus is the second state, and
   wherein after the apparatus in the second state performs a short distance wireless communication with the device, the device prints the image.

2. The apparatus according to claim 1, wherein the at least one processor causes the display screen to display third information for setting a print setting to be used for printing the image with the first information and the second information, after the image is settled as the print target and when the state of the apparatus is the second state.

3. The apparatus according to claim 2, wherein the third information includes a sheet type and a sheet size.

4. The apparatus according to claim 1, wherein the at least one processor causes the display screen to display the second information, in response to an instruction to the display screen on which the first information is displayed.

5. The apparatus according to claim 1, wherein the at least one processor causes the display screen to display the second information with a sheet size as a print setting to be used for printing the image, after the image is settled as the print target and when the state of the apparatus is the second state.

6. The apparatus according to claim 1, wherein the second state is a predetermined state in which the apparatus can communicate with the device by the short distance wireless communication.

7. The apparatus according to claim 6, wherein the short distance wireless communication is an NFC, and the predetermined state is a state in which the apparatus operates as an initiator in NFC.

8. The apparatus according to claim 1, wherein the short distance wireless communication is an NFC.

9. The apparatus according to claim 1, wherein the apparatus is a mobile phone.

10. The apparatus according to claim 1, further comprising a touch panel including the display screen,
wherein the at least one processor causes the display screen to display fourth information indicating the image designated by the user on the touch panel.

11. The apparatus according to claim 1, wherein the at least one processor selects a function from a plurality of functions which the apparatus can cause the device to execute, in accordance with an instruction by the user,
wherein the at least one processor further causes the device to read an original, after communication with a reading device via the short distance wireless communication, and
wherein the at least one processor further causes the display screen to display the second information, after a printing function for printing the image or a reading function for reading the original is selected.

12. The apparatus according to claim 1, wherein the at least one processor does not cause the display screen to display the second information, after the image is designated by the user and before the image is settled as the print target by the user.

13. The apparatus according to claim 1, wherein the at least one processor causes the display screen to display the first information and the second information in a same screen displayed by an application.

14. A method for an apparatus which causes a device to print an image, the method comprising:
causing a display screen to display first information for confirmation of the image, and not to display second information for prompting a user to put the apparatus close to the device for printing the image, before the image is settled as a print target by the user and when a state of the apparatus is a first state; and
causing the display screen to display the second information after the image is settled as the print target by the user and when the state of the apparatus is a second state, in response to an instruction to the display screen in which the first information is displayed,
wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device, and
wherein after the apparatus in the second state performs a short distance wireless communication with the device, the device prints the image.

15. The method according to claim 14, wherein the second state is a predetermined state in which the apparatus can communicate with the device by the short distance wireless communication.

16. The method according to claim 15, wherein the short distance wireless communication is an NFC, and the predetermined state is a state in which the apparatus operates as an initiator in NFC.

17. The method according to claim 14, wherein the short distance wireless communication is an NFC.

18. The method according to claim 14, wherein the apparatus is a mobile phone.

19. The method according to claim 14, wherein the display screen is a touch panel, and the touch panel is caused to display fourth information indicating the image designated by the user on the touch panel.

20. The method according to claim 14, further comprising selecting a function from a plurality of functions which the apparatus can cause the device to execute, in accordance with an instruction by the user,
wherein the device is caused to read an original, after communication with a reading device via the short distance wireless communication, and
wherein the display screen is caused to display the second information, after a printing function for printing the image or a reading function for reading the original is selected.

21. The method according to claim 14, wherein the display screen is not caused to display the second information, after the image is designated by the user and before the image is settled as the print target by the user.

22. The method according to claim 14, wherein the display screen is caused to display the first information and the second information in a same screen displayed by an application.

23. A method for an apparatus which causes a device to print an image, the method comprising:
causing a display screen to display first information for confirmation of the image, and not to display second information for prompting a user to put the apparatus close to the device for printing the image, before the image is settled as a print target by the user and when a state of the apparatus is a first state; and
causing the display screen to display the second information after the image is settled as the print target by the user and when the state of the apparatus is a second state,
wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device,
wherein the display screen is caused to display third information for setting a print setting to be used for printing the image, with the first information and the second information, after the image is settled as the print target and when the state of the apparatus is the second state, and
wherein after the apparatus in the second state performs a short distance wireless communication with the device, the device prints the image.

24. The method according to claim 23, wherein the third information includes a sheet type and a sheet size.

25. A method for an apparatus which causes a device to print an image, the method comprising:
  causing a display screen to display first information for confirmation of the image, and not to display second information for prompting a user to put the apparatus close to the device for printing the image, before the image is settled as a print target by the user and when a state of the apparatus is a first state;
  causing the display screen to display the second information after the image is settled as the print target by the user and when the state of the apparatus is a second state; and
  causing the display screen to display the second information with a sheet size as a print setting to be used for printing the image, after the image is settled as the print target by the user and when the state of the apparatus is the second state,
  wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device, and
  wherein after the apparatus in the second state performs a short distance wireless communication with the device, the device prints the image.

26. A non-transitory computer-readable storage medium storing a program for causing a computer to execute a method for controlling an apparatus, which causes a device to print an image, the method comprising:
  causing a display screen to display first information for confirmation of the image, and not to display second information for prompting a user to put the apparatus close to the device for printing the image, before the image is settled as a print target by the user and when a state of the apparatus is a first state; and
  causing the display screen to display the second information after the image is settled as the print target by the user and when the state of the apparatus is a second state, in response to an instruction to the display screen in which the first information is displayed,
  wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device, and
  wherein after the apparatus in the second state performs a short distance wireless communication with the device, the device prints the image.

27. A method for an apparatus which causes a device to print an image, the method comprising:
  causing a display screen to display first information for confirmation of the image, and not to display second information for prompting a user to put the apparatus close to the device for printing the image, before the image is settled as a print target by the user and when a state of the apparatus is a first state; and
  causing the display screen to display the second information with the first information, after the image is settled as the print target by the user and when the state of the apparatus is a second state,
  wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device, and
  wherein after the apparatus in the second state performs a short distance wireless communication with the device, the device prints the image.

28. A non-transitory computer-readable storage medium storing a program for causing a computer to execute a method for controlling an apparatus, which causes a device to print an image, the method comprising:
  causing a display screen to display first information for confirmation of the image, and not to display second information for prompting a user to put the apparatus close to the device for printing the image, before the image is settled as a print target by the user and when a state of the apparatus is a first state; and
  causing the display screen to display the second information after the image is settled as the print target by the user and when the state of the apparatus is a second state,
  wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device,
  wherein the display screen is caused to display third information for setting a print setting to be used for printing the image, with the first information and the second information, after the image is settled as the print target and when the state of the apparatus is the second state, and
  wherein after the apparatus in the second state performs a short distance wireless communication with the device, the device prints the image.

29. A non-transitory computer-readable storage medium storing a program for causing a computer to execute a method for controlling an apparatus, which causes a device to print an image, the method comprising:
  causing a display screen to display first information for confirmation of the image, and not to display second information for prompting a user to put the apparatus close to the device for printing the image, before the image is settled as a print target by the user and when a state of the apparatus is a first state;
  causing the display screen to display the second information after the image is settled as the print target by the user and when the state of the apparatus is a second state; and
  causing the display screen to display the second information with a sheet size as a print setting to be used for printing the image, after the image is settled as the print target by the user and when the state of the apparatus is the second state,
  wherein the state of the apparatus is changed from the first state to the second state when the image is settled as the print target by the user, the first state being a state in which the device is not caused to print the image even if the apparatus is put close to the device and the second state being a state in which the device can be caused to print the image if the apparatus is put close to the device, and wherein after the apparatus in the second state performs a short distance wireless communication with the device, the device prints the image.

* * * * *